US011510176B2

(12) United States Patent
He et al.

(10) Patent No.: US 11,510,176 B2
(45) Date of Patent: Nov. 22, 2022

(54) USER EQUIPMENT ASSISTANCE FOR PAGING PROCEDURES

(71) Applicant: QUALCOMM Incorporated, San Diego, CA (US)

(72) Inventors: Linhai He, San Diego, CA (US); Miguel Griot, La Jolla, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/177,487

(22) Filed: Feb. 17, 2021

(65) Prior Publication Data

US 2022/0264516 A1  Aug. 18, 2022

(51) Int. Cl.
*H04W 68/00* (2009.01)
*H04W 24/08* (2009.01)
*H04W 28/02* (2009.01)
*H04W 76/27* (2018.01)
*H04W 24/10* (2009.01)
*H04W 76/11* (2018.01)

(52) U.S. Cl.
CPC ......... *H04W 68/005* (2013.01); *H04W 24/08* (2013.01); *H04W 24/10* (2013.01); *H04W 28/0268* (2013.01); *H04W 76/11* (2018.02); *H04W 76/27* (2018.02)

(58) Field of Classification Search
CPC ... H04W 68/005; H04W 76/11; H04W 76/27; H04W 24/08; H04W 24/10; H04W 28/0268
USPC ........................................................ 370/329
See application file for complete search history.

(56) References Cited

U.S. PATENT DOCUMENTS

| 8,897,818 | B2* | 11/2014 | Weng | H04W 68/025 |
| | | | | 455/574 |
| 2012/0275366 | A1* | 11/2012 | Anderson | H04W 52/0219 |
| | | | | 370/311 |
| 2015/0271868 | A1* | 9/2015 | Rune | H04W 4/70 |
| | | | | 370/311 |
| 2018/0234919 | A1* | 8/2018 | Tsuda | H04W 88/04 |
| 2020/0229095 | A1* | 7/2020 | Shrestha | H04W 76/11 |

(Continued)

FOREIGN PATENT DOCUMENTS

| CA | 2750554 A1 * | 5/2012 | .......... H04W 68/025 |
| CA | 3079964 A1 * | 10/2020 | .............. H04W 4/06 |
| WO | WO-2020167205 A1 * | 8/2020 | ........ H04W 12/0431 |

*Primary Examiner* — Mong-Thuy T Tran
(74) *Attorney, Agent, or Firm* — Holland & Hart LLP

(57) ABSTRACT

Methods, systems, and devices for wireless communications are described. Generally, the described techniques provide for a user equipment (UE) to determine a time gap between receiving a paging early indication (PEI) and receiving a paging message based on a link quality of the UE. The UE may determine the time gap based on a number of reference signals the UE may measure after receiving the PEI to obtain channel information for accurately decoding a forthcoming paging message and a periodicity of the reference signals. The UE may transmit UE assistance information (UAI) to the base station during an active state to indicate the time gap. The UE may receive a configuration message from the base station indicating a configured time gap for the UE based on the UAI. The UE may receive the PEI and monitor a paging occasion for the paging message according to the configured time gap.

30 Claims, 21 Drawing Sheets

(56) References Cited

U.S. PATENT DOCUMENTS

2021/0168716 A1\* 6/2021 Mi ..................... H04W 52/0229
2021/0368475 A1\* 11/2021 Liu ....................... H04W 68/02

\* cited by examiner

USER EQUIPMENT ASSISTANCE FOR PAGING PROCEDURES

FIELD OF TECHNOLOGY

The following relates to wireless communications, including user equipment (UE) assistance for paging procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as a user equipment (UE).

In some systems, a base station may transmit a paging early indication (PEI) to a UE prior to a paging occasion for the UE to indicate whether the UE is to receive a paging message within the paging occasion. After receiving the PEI, the UE may attempt to obtain channel quality information for decoding the upcoming paging message within the paging occasion, but in some cases, the network may not utilize a time gap between a PEI and a corresponding paging occasion that allows the UE to obtain accurate channel information.

SUMMARY

The described techniques relate to improved methods, systems, devices, and apparatuses that support user equipment (UE) assistance for paging procedures. Generally, the described techniques enable a UE to determine a time gap between receiving a paging early indication (PEI) and receiving a paging message based on a link quality of the UE and transmit an indication of the time gap to a base station. The PEI may correspond to a paging occasion that is configured for the UE. If the UE receives a PEI that indicates the UE is to receive a forthcoming paging message within the paging occasion, the UE may measure a signal metric level of one or more downlink reference signals to identify parameters and other channel quality information used for decoding the paging message. A number of the downlink reference signals that the UE measures to obtain sufficient channel quality information may be based on a link quality of the UE, and the UE may determine the time gap (e.g., a PEI gap) based on the number of downlink reference signals and a periodicity of the downlink reference signals. The UE may transmit UE assistance information (UAI) to a base station to indicate the time gap (e.g., a preferred time gap for the UE), a coverage enhancement (CE) level for the UE, or both. The UE may transmit the UAI via a radio resource control (RRC) message while operating in an active state (e.g., a RRC connected mode). The base station may receive the UAI and determine a configured time gap, a configured CE level, or both, for the UE. The base station may transmit a configuration message (e.g., a RRC reconfiguration message) to the UE to indicate the configured time gap and the configured CE level. In some examples, the base station may transmit a control plane message to the network to indicate the configured time gap and CE level for the UE, and the base station or the network may transmit the PEI and corresponding paging message to the UE via a paging channel according to the configured time gap. The UE may receive the PEI during an inactive state (e.g., a RRC idle or RRC inactive mode) according to the configured time gap, which may provide for the UE to obtain accurate channel information for decoding the corresponding paging message, which may improve communication reliability.

A method for wireless communications at a user equipment (UE) is described. The method may include determining, based on a link quality of the UE, a time gap between a PEI for the UE and a paging message for the UE that corresponds to the PEI, transmitting, by the UE in an active state, UAI to a base station, the UAI including an indication of the time gap, receiving, from the base station, a configuration message indicating a configured time gap for the UE based on the indication of the time gap, receiving, by the UE in an inactive state, the PEI via a paging channel, and monitoring, in the inactive state, a paging occasion of the paging channel for the paging message according to the configured time gap.

An apparatus for wireless communications at a UE is described. The apparatus may include a processor, memory coupled with the processor, and instructions stored in the memory. The instructions may be executable by the processor to cause the apparatus to determine, based on a link quality of the UE, a time gap between a PEI for the UE and a paging message for the UE that corresponds to the PEI, transmit, by the UE in an active state, UAI to a base station, the UAI including an indication of the time gap, receive, from the base station, a configuration message indicating a configured time gap for the UE based on the indication of the time gap, receive, by the UE in an inactive state, the PEI via a paging channel, and monitor, in the inactive state, a paging occasion of the paging channel for the paging message according to the configured time gap.

Another apparatus for wireless communications at a UE is described. The apparatus may include means for determining, based on a link quality of the UE, a time gap between a PEI for the UE and a paging message for the UE that corresponds to the PEI, means for transmitting, by the UE in an active state, UAI to a base station, the UAI including an indication of the time gap, means for receiving, from the base station, a configuration message indicating a configured time gap for the UE based on the indication of the time gap, means for receiving, by the UE in an inactive state, the PEI via a paging channel, and means for monitoring, in the inactive state, a paging occasion of the paging channel for the paging message according to the configured time gap.

A non-transitory computer-readable medium storing code for wireless communications at a UE is described. The code may include instructions executable by a processor to determine, based on a link quality of the UE, a time gap between a PEI for the UE and a paging message for the UE that corresponds to the PEI, transmit, by the UE in an active state, UAI to a base station, the UAI including an indication of the time gap, receive, from the base station, a configuration message indicating a configured time gap for the UE based on the indication of the time gap, receive, by the UE in an inactive state, the PEI via a paging channel, and monitor, in the inactive state, a paging occasion of the paging channel for the paging message according to the configured time gap.

Some examples of the method, apparatuses, and non-transitory computer-readable medium described herein may further include operations, features, means, or instructions for determining a paging frame for the paging occasion for the UE based on an identifier (ID) of the UE and the configured time gap.

Some examples of the method, apparatuses, and non-transitory computer-readable medium described herein may further include operations, features, means, or instructions for determining an index for the paging occasion within the paging frame for the UE based on the configured time gap.

Some examples of the method, apparatuses, and non-transitory computer-readable medium described herein may further include operations, features, means, or instructions for identifying a number of measurements of downlink reference signals for obtaining channel quality information for the paging channel, where the number of measurements of the downlink reference signals may be based on the link quality of the UE and determining the time gap based on the number of measurements of the downlink reference signals and a periodicity associated with the downlink reference signals.

Some examples of the method, apparatuses, and non-transitory computer-readable medium described herein may further include operations, features, means, or instructions for decoding, during the configured time gap after receiving the PEI, the downlink reference signals, determining the channel quality information for the paging channel based on decoding the downlink reference signals, and decoding the paging message based on the channel quality information for the paging channel.

In some examples of the method, apparatuses, and non-transitory computer-readable medium described herein, the downlink reference signals include synchronization signal blocks (SSBs), tracking reference signals (TRSs), or channel state information reference signals (CSI-RSs), or any combination thereof.

Some examples of the method, apparatuses, and non-transitory computer-readable medium described herein may further include operations, features, means, or instructions for transitioning to the active state before transmitting the UAI, where the active state may be a RRC connected state, receiving, from the base station, a release message, and transitioning to the inactive state based on the release message, where the inactive state may be a RRC inactive state or a RRC idle state.

Some examples of the method, apparatuses, and non-transitory computer-readable medium described herein may further include operations, features, means, or instructions for determining a change in the link quality of the UE, transitioning from the inactive state to the active state, and transmitting, to the base station, second UAI indicating a second time gap for the UE based on the change in the link quality of the UE.

Some examples of the method, apparatuses, and non-transitory computer-readable medium described herein may further include operations, features, means, or instructions for receiving, via the PEI, an indication of the paging message for the UE, transitioning from a sleep mode of a discontinuous reception (DRX) cycle to a wake mode of the DRX cycle for the paging occasion based on the indication of the paging message, and monitoring the paging occasion for the paging message based on transitioning to the wake mode of the DRX cycle.

Some examples of the method, apparatuses, and non-transitory computer-readable medium described herein may further include operations, features, means, or instructions for transmitting, to the base station via the UAI, a first CE level supported by the UE, receiving, from the base station via the configuration message, a configured CE level for the UE, and receiving the PEI and the paging message according to the configured CE level.

Some examples of the method, apparatuses, and non-transitory computer-readable medium described herein may further include operations, features, means, or instructions for determining a paging frame for the paging occasion for the UE based on the configured CE level.

Some examples of the method, apparatuses, and non-transitory computer-readable medium described herein may further include operations, features, means, or instructions for receiving one or more reference signals from the base station, measuring a signal parameter of the one or more reference signals received by the UE, and determining the link quality of the UE based on the measured signal parameter.

Some examples of the method, apparatuses, and non-transitory computer-readable medium described herein may further include operations, features, means, or instructions for transmitting the UAI to the base station via a RRC message and receiving the configuration message from the base station in response to the UAI, where the configuration message may be a RRC reconfiguration message.

In some examples of the method, apparatuses, and non-transitory computer-readable medium described herein, determining the time gap may include operations, features, means, or instructions for determining the time gap to be a first time gap less than a second time gap based on the link quality exceeding a link quality threshold.

A method for wireless communications at a base station is described. The method may include receiving, from a UE, UAI including an indication of a time gap between a PEI for the UE and a paging message for the UE that corresponds to the PEI, transmitting, to the UE, a configuration message indicating a configured time gap for the UE based on the indication of the time gap, transmitting, to the UE, the PEI via a paging channel, and transmitting, to the UE, the paging message during a paging occasion according to the configured time gap.

An apparatus for wireless communications at a base station is described. The apparatus may include a processor, memory coupled with the processor, and instructions stored in the memory. The instructions may be executable by the processor to cause the apparatus to receive, from a UE, UAI including an indication of a time gap between a PEI for the UE and a paging message for the UE that corresponds to the PEI, transmit, to the UE, a configuration message indicating a configured time gap for the UE based on the indication of the time gap, transmit, to the UE, the PEI via a paging channel, and transmit, to the UE, the paging message during a paging occasion according to the configured time gap.

Another apparatus for wireless communications at a base station is described. The apparatus may include means for receiving, from a UE, UAI including an indication of a time gap between a PEI for the UE and a paging message for the UE that corresponds to the PEI, means for transmitting, to the UE, a configuration message indicating a configured time gap for the UE based on the indication of the time gap, means for transmitting, to the UE, the PEI via a paging channel, and means for transmitting, to the UE, the paging message during a paging occasion according to the configured time gap.

A non-transitory computer-readable medium storing code for wireless communications at a base station is described. The code may include instructions executable by a processor to receive, from a UE, UAI including an indication of a time gap between a PEI for the UE and a paging message for the UE that corresponds to the PEI, transmit, to the UE, a configuration message indicating a configured time gap for the UE based on the indication of the time gap, transmit, to the UE, the PEI via a paging channel, and transmit, to the UE, the paging message during a paging occasion according to the configured time gap.

Some examples of the method, apparatuses, and non-transitory computer-readable medium described herein may further include operations, features, means, or instructions for determining the paging occasion for the UE based on a hashing function including an ID of the UE and the configured time gap and transmitting the paging message during the paging occasion based on the hashing function.

Some examples of the method, apparatuses, and non-transitory computer-readable medium described herein may further include operations, features, means, or instructions for determining the paging occasion for the UE based on a hashing function including a configured CE level for the UE and transmitting the paging message during the paging occasion based on the hashing function.

Some examples of the method, apparatuses, and non-transitory computer-readable medium described herein may further include operations, features, means, or instructions for determining the configured time gap for the UE based on the indication of the time gap for the UE and scheduling information for one or more other UEs, where the scheduling information may be based on one or more other time gaps for the one or more other UEs.

Some examples of the method, apparatuses, and non-transitory computer-readable medium described herein may further include operations, features, means, or instructions for transmitting, to a network node, a control plane message indicating the configured time gap for the UE.

Some examples of the method, apparatuses, and non-transitory computer-readable medium described herein may further include operations, features, means, or instructions for receiving, from a network node, a paging notification message indicating the paging message for the UE and the configured time gap for the UE.

In some examples of the method, apparatuses, and non-transitory computer-readable medium described herein, transmitting the configuration message may include operations, features, means, or instructions for transmitting a RRC reconfiguration message indicating the configured time gap.

Some examples of the method, apparatuses, and non-transitory computer-readable medium described herein may further include operations, features, means, or instructions for receiving, from the UE via the UAI, an indication of a CE level for the UE, transmitting, to the UE via the configuration message, a configured CE level for the UE, and transmitting the PEI and the paging message according to the configured CE level.

A method for wireless communications at a network node is described. The method may include receiving, from a base station, a control plane message indicating a configured time gap for a UE, the configured time gap between transmission of a PEI and transmission of a paging message via a paging channel, identifying data for the UE after receiving the control plane message, and transmitting, to the base station, a paging notification message indicating the paging message for the UE and the data for the UE.

An apparatus for wireless communications at a network node is described. The apparatus may include a processor, memory coupled with the processor, and instructions stored in the memory. The instructions may be executable by the processor to cause the apparatus to receive, from a base station, a control plane message indicating a configured time gap for a UE, the configured time gap between transmission of a PEI and transmission of a paging message via a paging channel, identify data for the UE after receiving the control plane message, and transmit, to the base station, a paging notification message indicating the paging message for the UE and the data for the UE.

Another apparatus for wireless communications at a network node is described. The apparatus may include means for receiving, from a base station, a control plane message indicating a configured time gap for a UE, the configured time gap between transmission of a PEI and transmission of a paging message via a paging channel, means for identifying data for the UE after receiving the control plane message, and means for transmitting, to the base station, a paging notification message indicating the paging message for the UE and the data for the UE.

A non-transitory computer-readable medium storing code for wireless communications at a network node is described. The code may include instructions executable by a processor to receive, from a base station, a control plane message indicating a configured time gap for a UE, the configured time gap between transmission of a PEI and transmission of a paging message via a paging channel, identify data for the UE after receiving the control plane message, and transmit, to the base station, a paging notification message indicating the paging message for the UE and the data for the UE.

Some examples of the method, apparatuses, and non-transitory computer-readable medium described herein may further include operations, features, means, or instructions for storing, at the network node, the configured time gap for the UE and one or more other time gaps for one or more other UEs.

Some examples of the method, apparatuses, and non-transitory computer-readable medium described herein may further include operations, features, means, or instructions for transmitting, to a second base station, a second paging notification message indicating the configured time gap for the UE based on a connection between the UE and the second base station.

DETAILED DESCRIPTION

Figure 1:
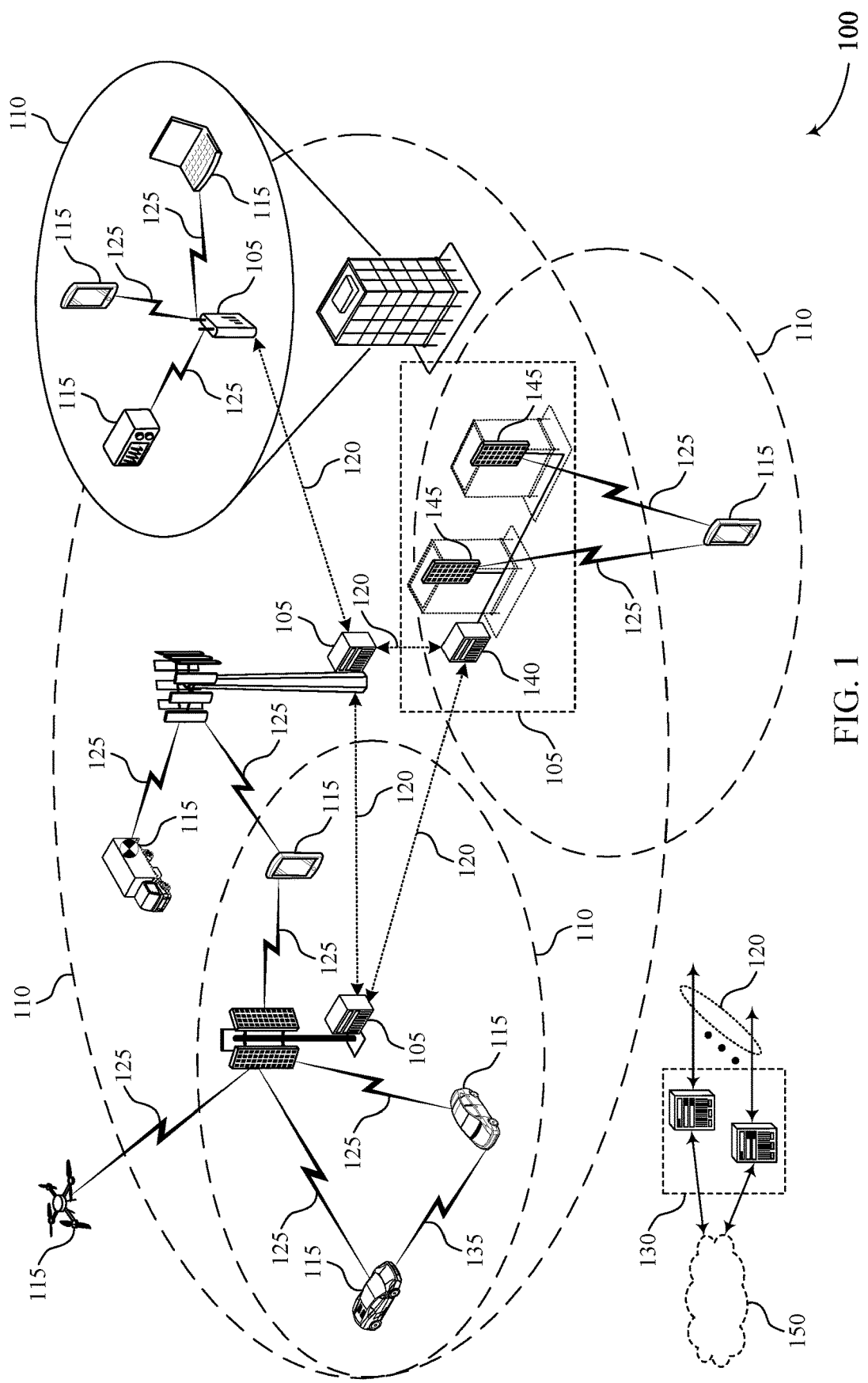
FIG. 1 illustrates an example of a wireless communications system that supports user equipment (UE) assistance for paging procedures in accordance with aspects of the present disclosure.

In some wireless communications systems, a user equipment (UE) may operate in a radio resource control (RRC) idle mode or an RRC inactive mode, each of which may be referred to as an inactive state, until the UE has data to transmit or receive (e.g., or another operation to perform via a network connection). The UE may communicate with the network by establishing an RRC connection and transitioning to an RRC connected mode, which may be referred to as an active state. The UE may be configured with a discontinuous reception (DRX) cycle for paging (e.g., a paging cycle), which may indicate how frequently the UE may monitor a paging channel for paging from the network. The UE may monitor for paging according to the DRX cycle while operating in the inactive state to reduce power consumption (e.g., the UE may consume less power while operating in an inactive state than in an active state), and a paging message may indicate whether the UE is to transition to an active state to receive data. A DRX cycle may include a number of radio frames, and one or more radio frames within the DRX cycle may be configured as paging frames (e.g., periodic paging frames) for the UE. A paging frame may include a paging occasion configured for the UE. The UE may operate in a low power state during a sleep duration of the DRX cycle, and the UE may wake up to monitor for a paging message within each configured paging occasion.

The network may transmit a paging early indication (PEI) to the UE to indicate whether a subsequent paging occasion includes a scheduled paging message for the UE. The PEI may be transmitted via dedicated signaling that may be received by the UE with less power than paging downlink control information (DCI) or a paging message. In some examples, the PEI may be referred to as a wakeup signal (WUS). After receiving the PEI (e.g., if the PEI indicates that the UE is to receive a subsequent paging message), and to help the UE reliably decode the paging message, the UE may wake up and measure a reference signal receive power (RSRP) of one or more reference signals to identify parameters or other channel quality information used for accurately decoding the forthcoming paging message. The number of reference signals that a UE may measure before decoding a paging message may be based on a link quality of the UE. While the UE operates in the inactive state, the network may not know the link quality of the UE. As such, in some cases, the network may not configure an adequate timing gap between a PEI and a paging occasion for the UE to obtain accurate channel quality information, which may result in decoding failure of the paging message at the UE.

As described herein, the UE may determine a time gap (e.g., a PEI gap) between receiving a PEI and receiving a paging message based on a link quality of the UE. The UE may determine a number of reference signals that the UE may monitor in order to obtain sufficient channel quality information (e.g., paging channel quality information) to accurately decode the corresponding paging message. The reference signals may be transmitted by a base station periodically, and the UE may determine the PEI gap based on the number of reference signals and the periodicity of the reference signals. The UE may transmit UE assistance information (UAI) to the base station to indicate the PEI gap that is supported by the UE (e.g., a preferred PEI gap). The UAI may be transmitted via an RRC message while the UE is in an active (e.g., RRC connected) state. In some examples, the UAI may indicate a coverage enhancement (CE) level that is supported by the UE. The base station may receive UAI from one or more UEs and determine whether to configure each of the UEs with respective PEI gaps or CE levels based on scheduling information for the UEs. For example, if a relatively large number of UEs (e.g., a number of UEs above a threshold) indicate different PEI gaps, the base station may be unable to support each PEI gap requested by the UEs, and the base station may instead determine a configured PEI gap for the UEs.

The base station may transmit a configuration message (e.g., an RRC reconfiguration message) to each UE to indicate a configured PEI gap (e.g., that may be the same as or different from the preferred PEI gap) for the UE, a configured CE level for the UE, or both. The base station may transmit a PEI and a subsequent paging message according to the configured PEI gap, and the UE may monitor for the PEI and the paging message based on the configured PEI gap for the UE. In some examples, a paging occasion for one or more UEs may be configured based on the configured PEI gap for each UE, the configured CE level for each UE, an identifier (ID) of each UE, or a combination thereof. The base station may transmit a control plane message (e.g., an N2 release message) to the core network (e.g., an access and mobility management function (AMF)) indicating the configured PEI gap and configured CE level for each UE. When new data is received for a given UE, the core network may transmit a paging notification message to the base station to indicate the new data, the configured PEI gap, the configured CE level, or a combination thereof, for the respective UE.

Aspects of the disclosure are initially described in the context of wireless communications systems. Additional aspects are described in the with reference to paging timelines and process flows. Aspects of the disclosure are further illustrated by and described with reference to apparatus diagrams, system diagrams, and flowcharts that relate to UE assistance for paging procedures.

FIG. 1 illustrates an example of a wireless communications system 100 that supports UE assistance for paging procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an ID for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may determine a time gap between receiving a PEI and receiving a paging message via a paging channel based on a link quality of the UE 115. The UE 115 may transmit an indication of the time gap to a base station 105. If the UE 115 receives a PEI that indicates a paging message for the UE 115, the UE 115 may measure a signal metric level (e.g., an RSRP level) of one or more downlink reference signals to identify parameters or other channel quality information used for accurately decoding the paging message. A number of the downlink reference signals that the UE 115 measures to obtain sufficient channel quality information may be based on a link quality of the UE 115. The UE 115 may determine the time gap (e.g., a PEI gap) based on the number of downlink reference signals and a periodicity of the downlink reference signals. The UE 115 may transmit UAI to a base station 105 to indicate the time gap (e.g., a preferred time gap for the UE 115), a CE level for the UE 115, or both. The UE 115 may transmit the UAI via an RRC message while operating in an active state (e.g., an RRC connected mode). The base station 105 may receive the UAI and determine a configured time gap, a configured CE level, or both, for the UE 115. The base station 105 may transmit a configuration message (e.g., an RRC reconfiguration message) to the UE 115 to indicate the configured time gap and the configured CE level. In some examples, the UE 115 may transition to an inactive state (e.g., RRC idle or RRC inactive) during a DRX cycle for paging (e.g., a paging cycle). The base station 105 may transmit the PEI and corresponding paging message to the UE 115 via a paging channel according to the configured time gap. The UE 115 may receive the PEI and measure one or more reference signals to obtain accurate channel quality information for decoding the corresponding paging message according to the configured time gap, which may improve communication reliability.

In some examples, the base station 105 may transmit a control plane message (e.g., a N2 release message) to the core network 130 (e.g., an AMF) via a backhaul link 120 to indicate the configured time gap and CE level for the UE 115. The core network 130 may maintain a list of configured time gaps and CE levels for each UE 115. If new data arrives for the UE 115, the core network 130 may transmit a paging notification message to the base station 105 to indicate the new data and the configured time gap and CE level for the UE 115. The base station 105 may page the UE 115 by transmitting a PEI and a corresponding paging message within a paging occasion for the UE 115.

Figure 2:
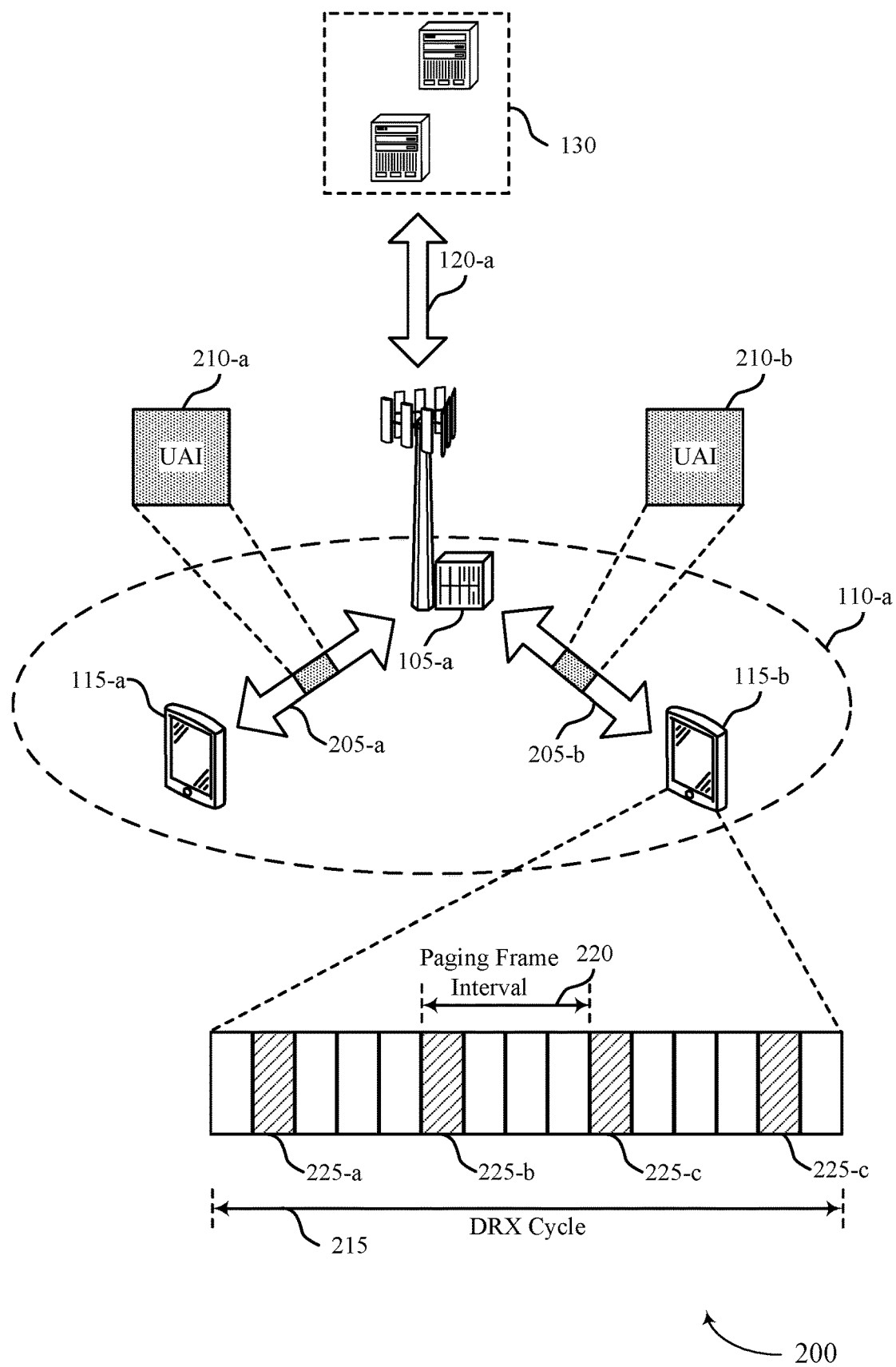
FIG. 2 illustrates an example of a wireless communications system that supports UE assistance for paging procedures in accordance with aspects of the present disclosure.

FIG. 2 illustrates an example of a wireless communications system 200 that supports UE assistance for paging procedures in accordance with aspects of the present disclosure. The wireless communications system 200 may include UEs 115-a and 115-b (e.g., among other UEs 115), and base station 105-a, which may represent examples of a UE 115 and a base station 105, as described with reference to FIG. 1. Base station 105-a may communicate with UEs 115-a and 115-b in a geographic coverage area 110-a via communication links 205-a and 205-b, respectively. Base station 105-a may communicate with a core network 130-a (e.g., an AMF) via a backhaul link 120-a, which may be an example of a backhaul link 120, as described with reference to FIG. 1. UEs 115-a and 115-b may transmit UAI messages 210-a and 210-b to base station 105-a to indicate PEI gaps for receiving paging messages.

UEs 115-a and 115-b may operate in one or more of an RRC idle mode, an RRC inactive mode, and an RRC connected mode. For example, UE 115-a may operate in an RRC idle or RRC inactive mode (which may be referred to herein as inactive states) until UE 115-a has data to transmit, data to receive, or another operation to perform (e.g., in which a connection to the core network 130 may be desired). If UE 115-a has data to transmit or if UE 115-a receives an indication (e.g., via a paging message or some other signaling) of a forthcoming data message for reception by UE 115-a, UE 115-a may establish an RRC connection with base station 105-a, and UE 115-a may transition to an RRC connected mode (which may be referred to herein as an activate state). Once the data session is complete, base station 105-a may transmit an RRC release message to release UE 115-a, and UE 115-a may return to the inactive state. UE 115-a may consume less power while operating in the inactive state than the active state, and in some cases, UE 115-*a* may default to the inactive state to reduce power consumption.

UEs 115-*a* and 115-*b* may transmit UAI 210-*a* and UAI 210-*b*, respectively, to base station 105-*a* (e.g., via communication links 205-*a* and 205-*b*, respectively). The UAI 210 may be transmitted by each of UEs 115-*a* and 115-*b* via an RRC signaling (e.g., a Layer 3 RRC message) when the respective UE 115 operates in the active state (e.g., when the UE 115 establishes an RRC connection). The UAI 210 may indicate a preference for changing one or more configurations for the UE 115 (e.g., a number of carriers, a total bandwidth for operations by the UE 115, a number of MIMO layers supported by the UE 115, a supported PEI gap, other UE information, or a combination thereof). The UE 115 may not transmit the UAI 210 while operating in the inactive state.

While operating in the inactive state, the UE 115 may monitor a paging channel for a paging message from the core network 130 (e.g., from the core network 130 via base station 105-*a*). The paging message may indicate that the UE 115 has data to transmit, or some other operation to perform, and the UE 115 may determine whether to establish an RRC connection based on the paging message. The core network 130 may configure one or more UEs 115 with a DRX cycle 215, which may be referred to as a paging cycle. The DRX cycle 215 may indicate how frequently the UEs 115 may monitor a paging channel for a paging message (e.g., while in the inactive state). Although the DRX cycle 215 illustrated in FIG. 2 is configured for UE 115-*b*, the core network may configure respective DRX cycles 215 for UE 115-*a*, one or more other UEs 115, or a combination thereof. The DRX cycles 215 may be UE-specific, cell-specific (e.g., advertised by the core network 130), or both. As such, UE 115-*a* may be configured with a DRX cycle 215 that is the same as or different from the DRX cycle 215 configured for UE 115-*b*. A UE-specific DRX cycle 215 may be configured based on an ID of each respective UE 115, and a cell-specific DRX cycle 215 may be configured for one or more UEs 115 within a respective cell (e.g., a geographic coverage area 110).

The DRX cycle 215 may include a number of radio frames (e.g., such as 32, 64, 128, 256, or some other number of radio frames) based on a configured duration of the DRX cycle 215. One or more of the radio frames within the DRX cycle 215 may be a paging frame 225 (e.g., paging frames 225-*a*, 225-*b*, 225-*c*, and 225-*d*). A paging frame interval 220 may be configured between adjacent paging frames 225 such that a paging frame 225 may be transmitted periodically (e.g., every 1, 2, 4, 6, 8, 16, or some other number of radio frames) within the DRX cycle 215. In the example of FIG. 2, the DRX cycle 215 for UE 115-*b* may include a paging frame interval 220 of four radio frames. The number of paging frames 225 in each DRX cycle 215 may be determined based on the duration of the DRX cycle 215, the periodicity of the paging frames 225, and an offset of the paging frames 225 (e.g., a time domain offset associated with a number of radio frames). In one example, if the DRX cycle duration is 320 ms, the inter-paging frame interval is 80 ms, and the paging frame offset is six radio frames, UE 115-*b* may determine that there are four paging frames 225 in the DRX cycle 215, and the UE 115 may monitor the four paging frames 225 accordingly.

A paging frame 225 may be a reference (e.g., starting) frame for a UE 115 to monitor for a paging message. For example, a paging frame 225 may include some number of subframes or slots, and one or more of the slots within a paging frame may be designated as a paging occasion (e.g., a time instance at which a network entity may transmit a paging message for one or more UEs 115 or other devices). The core network 130 may determine the number of paging occasions (e.g., 1, 2, 4, or some other number of paging occasions) per paging frame 225 within a DRX cycle 215. Each paging occasion may be configured by the network, and each UE 115 may be assigned to a paging occasion. In one example, a paging frame 225 (e.g., a paging frame 225 having an index of 32, or some other paging frame 225 within the DRX cycle 215) may include a first paging occasion and a second paging occasion (e.g., slot 4 and slot 9 within the paging frame 225 may be configured as the respective paging occasions, or some other slots or subframes within the paging frame 225), and a first set of UEs 115 may be assigned to the first paging occasion and a second set of UEs 115 may be assigned to the second paging occasion.

A UE 115, a base station 105, or both, may determine which paging occasion within each paging frame 225 is configured for the UE 115 (e.g., a paging occasion index, is, for the UE 115) based on an ID of the UE 115. Each paging occasion may include a set of monitoring occasions (e.g., consecutive physical downlink control channel (PDCCH) monitoring occasions). The number of monitoring occasions within each paging occasion may be based on the number of downlink reference signals configured for paging, such as synchronization signal blocks (SSBs), tracking reference signals (TRSs), CSI-RSs, or a combination thereof, transmitted within the paging occasion (e.g., a number, S, of transmitted SSBs, which may be indicated via a system information block (SIB), such as SIB1), a number of monitoring occasions per SSB in a paging occasion (e.g., a number, X, of PDCCH monitoring occasions per SSB, such as 1, 2, 3, 4, or some other number of PDCCH monitoring occasions), or both (e.g., there may be S×X consecutive monitoring occasions per paging occasion). The UE 115 may determine a starting monitoring occasion number for a paging occasion (e.g., with index is) based on the number of monitoring occasions per paging occasion and the index of the paging occasion (e.g., $i_s \times S \times X$). Additionally, or alternatively, the starting monitoring occasion number may be configured for the UE 115 (e.g., the $[x \times S+1]^{th}$ monitoring occasion for paging in a paging occasion may correspond to the $K^{th}$ transmitted SSB, where x=0, 1, . . . , X, and K=1, 2, . . . , S).

The UE 115 may monitor a search space for the paging message. In some cases (e.g., for type 1 common search spaces (CSSs) without dedicated RRC configuration, type 0 CSS, type 0A CSS, type 2 CSS, or a combination thereof), the monitoring occasion may be any OFDM symbol(s) within a slot, within a span of a number (e.g., three) of consecutive OFDM symbols within a slot, or both. In some cases, the base station 105 may transmit the paging message to the UE 115 via one or more beams (e.g., directional beams). Because the UE 115 may operate in the inactive state during the DRX cycle 215, the base station 105 may not know which beam(s) the UE 115 may monitor (e.g., because the UE 115 may not transmit the UAI 210 or other signaling indicative of the beams supported by the UE 115 while in the inactive state). In such cases, the base station 105 may transmit the paging message to the UE 115 via each beam to improve the probability that the UE 115 will receive the paging message (e.g., regardless of a link quality of the UE 115, a location of the UE 115 in a cell, or the like).

Accordingly, a UE 115, such as UE 115-*b*, may monitor a paging channel during each paging occasion of a configured DRX cycle 215. To reduce power consumption, UE 115-*b* may enter a low power state (e.g., a sleep mode or an off duration) between paging occasions for UE 115-*b*, and UE 115-*b* may wake up (e.g., enter a high power state) prior to the paging occasion to monitor the paging occasion for a potential paging message. During a sleep mode, UE 115-*b* may turn off some or all of the circuitry of UE 115-*b*. In some cases, to further reduce power consumption by UE 115-*b*, base station 105-*a* or some other network entity may transmit a PEI, which may be also be referred to as a WUS. The PEI may be transmitted via dedicated PEI signaling prior to a corresponding paging occasion to indicate whether UE 115-*b* is to wake up to receive a paging message or remain in a sleep mode. If there is no paging message for UE 115-*b*, the PEI may indicate that UE 115-*b* is to remain in the sleep mode to reduce power consumption.

The PEI signaling may be configured such that UE 115-*b* may receive and decode the PEI with less power than UE 115-*b* may use to monitor for or receive a paging message. For example, a UE 115 may include a first modem (e.g., a low power modem) that is configured to monitor for a PEI and one or more other modems that are configured for other operations by the UE 115. If the first modem receives and decodes a PEI that indicates the UE 115 is to receive a subsequent paging message, the first modem may activate (e.g., turn on) one or more of the other modems of the UE 115 to receive and decode the paging message. If the PEI indicates the UE 115 is not to receive a subsequent paging message, the one or more other modems may remain in a deactivated (e.g., an off) state. Because the first modem consumes less power than the other modems, the UE 115 may reduce power consumption by waking up the other modems based on the PEI.

In some examples, the PEI may be a sequence-based signal. The UE 115 (e.g., the first modem of the UE 115) may be configured to identify the PEI based on a configured sequence, which may reduce power consumption by the UE 115. Additionally, or alternatively, the PEI may be a PDCCH message configured for paging indications. For example, the PDCCH message may be scrambled with a radio network temporary identifier (RNTI) format configured for PEIs, the PDCCH message may be sent in a configured time and frequency location (e.g., configured time and frequency resources), or both, such that the UE 115 may refrain from performing blind decoding to receive and decode the PEI via the PDCCH message (e.g., a special purpose PDCCH message for PEI). The UE 115 may thereby use less power to decode the PEI than the UE 115 may use for decoding paging DCI or paging messages. In some cases, a time period between the PEI and the corresponding paging occasion may be relatively long (e.g., one second, two seconds, or some other duration), and the channel conditions may change such that the UE 115 may not know the updated channel conditions for decoding the paging message.

After receiving the PEI (e.g., if the PEI indicates that UE 115-*b* is to receive a subsequent paging message), UE 115-*b* may wake up and monitor for one or more downlink reference signals (e.g., SSBs, TRSs, CSI-RSs, or a combination thereof, that may be configured for UE 115-*b* to use for a paging procedure) and identify parameters and other channel quality information for accurately decoding the paging message. In some examples, UE 115-*b* may measure a RSRP level associated with the downlink reference signals to obtain the channel parameters. A number of downlink reference signals that UE 115-*b* may measure between the PEI and the corresponding paging message may be based on a link quality of UE 115-*b*. For example, if the link quality of UE 115-*b* is relatively low, UE 115-*b* will measure more downlink reference signals to obtain sufficient channel quality information for accurately decoding the corresponding paging message than if the link quality of UE 115-*b* is relatively high. As such, a time gap (which may be referred to as a PEI gap) between receiving the PEI and receiving the paging message by a UE 115 may change dynamically based on a link quality of the UE 115. One or more UEs 115 within a network may be associated with different time gaps based on respective link qualities of the UEs 115. Methods for determining a duration of the time gaps are described in further detail with reference to FIG. 3.

Because a UE 115 may operate in an inactive state during a paging cycle, the core network 130 may not know the link quality of each UE 115 in the network. For example, when UE 115-*b* operates in the inactive state, UE 115-*b* may not transmit UAI 210-*b* or other signaling indicative of a link quality of UE 115-*b* to base station 105-*a* (e.g., and the core network 130). The link quality of UE 115-*b* may change dynamically based on a mobility of UE 115-*b* or other parameters associated with UE 115-*b*. As such, base station 105-*a* may not configure an adequate time gap between a PEI and a corresponding paging message for UE 115-*b* to obtain accurate channel quality information. If base station 105-*a* transmits a PEI and a corresponding paging message to UE 115-*b* according to a time gap that UE 115-*b* does not support (e.g., due to a link quality of UE 115-*b*), UE 115-*b* may be unable to obtain sufficient parameters and other channel quality information to accurately decode the paging message.

As described herein, a UE 115, such as UEs 115-*a* and 115-*b*, may determine a PEI gap that is supported by the UE 115 (e.g., a preferred PEI gap) based on a link quality of the UE 115. UEs 115-*a* and 115-*b* may transmit UAI 210-*a* and UAI 210-*b*, respectively, to base station 105-*a* to indicate respective supported PEI gaps. For example, UAI 210-*a* may indicate a PEI gap(s) that is supported by UE 115-*a*, a CE level supported by UE 115-*a*, other UE information, or a combination thereof. UEs 115-*a* and 115-*b* may transmit the respective UAI 210 via an RRC message (e.g., a layer 3 RRC message) while the UE 115 is in an active state (e.g., an RRC connected mode). In some examples, UE 115-*a* may establish an RRC connection with base station 105-*a* and transition to the active state to indicate an updated PEI gap for UE 115-*a* (e.g., to transmit an updated UAI 210-*a*). In other examples, UE 115-*a* may establish an RRC connection with base station 105-*a* for a data session, or some other purpose, and UE 115-*a* may transmit UAI 210-*a* indicating a supported PEI gap for UE 115-*a* while in the active state.

Base station 105-*a* may receive UAI 210-*a*, UAI 210-*b*, and one or more other UAIs 210 from one or more other UEs 115 within geographic coverage area 110-*a*. Base station 105-*a* may configure UEs 115-*a* and 115-*b* with configured PEI gaps based on UAI 210-*a*, UAI 210-*b*, scheduling information for one or more other UEs 115 (e.g., based on the one or more other UAIs 210), or a combination thereof. Base station 105-*a* may transmit a configuration message to each UE 115 to indicate the configured PEI gap, a configured CE level for the UE 115, or both. In some examples, the configuration message may be an RRC reconfiguration message, and base station 105-*a* may transmit the RRC reconfiguration message to the UE 115 while the UE 115 is in the active state (e.g., during an established RRC connection). In some examples, base station 105-*a* may transmit an RRC release message to the UE 115 to terminate the RRC connection.

If base station 105-*a* receives multiple UAIs 210 and the number of different supported PEI gaps indicated via the UAIs 210 is greater than a threshold (e.g., a number of supportable PEI gaps for the network), base station 105-a may determine a configured PEI gap for each of the respective UEs 115 or for each subset of the respective UEs 115 (e.g., base station 105-a may select a PEI gap from the number of supported PEI gaps randomly, select a most common supported PEI gap, or the like). Thus, in some examples, base station 105-a may configure a PEI gap for UE 115-a that is different from the supported PEI gap that UE 115-a indicated via UAI 210-a. Additionally, or alternatively, base station 105-a may configure UE 115-a with a configured PEI gap that is the same as the supported PEI gap.

Each PEI transmitted by base station 105-a may correspond to a respective paging occasion for one or more UEs 115. For example, base station 105-a may transmit one PEI prior to each paging occasion. If one or more UEs 115 share a paging occasion, the one or more UEs 115 may receive the corresponding PEI according to a similar PEI gap. Accordingly, it may be desirable for base station 105-a to configure similar PEI gaps for one or more UEs 115 that share a paging occasion. For example, if UE 115-a indicates a supported PEI gap of two radio frames and UE 115-b indicates a supported PEI gap of two radio frames, UEs 115-a and 115-b may share a paging occasion and corresponding PEI (e.g., while maintaining accurate timing for communications). In another example, if UE 115-a indicates a supported PEI gap of two radio frames and UE 115-b indicates a supported PEI gap of ten radio frames, one of UEs 115-a or 115-b may be penalized if the UEs 115 share a paging occasion and corresponding PEI.

As described herein, to improve coordination of scheduled PEI gaps for different UEs 115, a base station 105 may assign paging occasions for each UE 115 based on a configured PEI gap (e.g., a configured WUS gap) for the UE 115. For example, a hashing function for determining a paging frame 225 and a paging occasion within the paging frame 225 for a UE 115 may include the configured PEI gap for the UE 115. In some examples, the hashing function may additionally or alternatively include a configured CE level for the UE 115. The base station 105, the UE 115, or both, may perform a hashing calculation to determine a SFN of a paging frame 225 that is configured for the UE 115 based on Equation 1 and the index (is) of the paging occasion configured for the UE 115 based on Equation 2.

$$(SFN + PF_{offset}) \bmod T = (T \text{ div } N) \times (UE_{ID} \otimes WUS_{Gap} \bmod N) \quad \text{Equation (1)}$$

$$i_s = \text{floor}\left(UE_{ID} \otimes \frac{WUS_{Gap}}{N}\right) \bmod N_s \quad \text{Equation (2)}$$

In the example of Equations 1 and 2 (e.g., hashing functions), the symbol $\otimes$ may be a mathematic operator that may represent one of addition, multiplication, division, or exclusive OR (XOR). In Equation 2, $N_s$ may be based on a search space for the UE 115. For example, if the paging-SearchSpace field is configured such that SearchSpaceId=0, $N_s$ may be equal to one or two. If $N_s=1$, a paging occasion may start from the first PDCCH monitoring occasion for paging in the respective paging frame 225. If $N_s=2$, a paging occasion may be in the first half of the paging frame 225 (e.g., $i_s=0$) or the second half of the paging frame 225 (e.g., $i_s=1$).

Base station 105-a may transmit a control plane message (e.g., a N2 release message) to the core network 130 (e.g., an AMF) via backhaul link 120-a to indicate the configured PEI gap, a configured CE level, or both, for UEs 115-a and 115-b. The core network 130 may maintain a list of configured PEI gaps for each UE 115 in the network. If new data arrives for UE 115-a, UE 115-b, or another UE 115 within geographic coverage area 110-a, the core network 130 may transmit a paging notification message to base station 105-b to indicate the new data. As described herein, the paging notification message may additionally, or alternatively, include the most recent PEI gap and CE level that has been configured for the respective UE 115. Base station 105-a may receive the paging notification message and transmit a PEI and corresponding paging message to the respective UE 115 accordingly.

In one example, UE 115-a may receive a configuration message from a base station 105-a in a first geographic coverage area 110-a (e.g., cell) indicating a configured PEI gap and a configured CE level for UE 115-a. UE 115-a may move from the first geographic coverage area 110 to geographic coverage area 110-a, and base station 105-a may receive a paging notification message from the core network 130 that indicates the configured PEI gap and the configured CE level for UE 115-a (e.g., as configured by the base station 105-a). As such, base station 105-a may page UE 115-a according to the configured PEI gap (e.g., a UE-specific PEI gap) and CE level. If UE 115-a does not have a similar link quality in geographic coverage area 110-a as in the first geographic coverage area 110-a, the configured PEI gap may not be sufficient for UE 115-a to accurately decoding the paging message. In such cases, UE 115-a may establish an RRC connection with base station 105-a and transmit a second UAI 210-a to indicate a change in the supported PEI gap (e.g., and the corresponding link quality).

A UE 115 may thereby determine a time gap between a PEI and a corresponding paging message for obtaining channel parameters to accurately decode the paging message based on a link quality of the UE 115. The UE 115 may indicate the time gap to the core network 130 via UAI transmitted to a base station 105 while the UE 115 is in an RRC connected state. The base station 105 may page the UE 115 according to the time gap to provide for reduced power consumption by the UE 115 without reducing an accuracy or reliability of the communications.

Figure 3A:
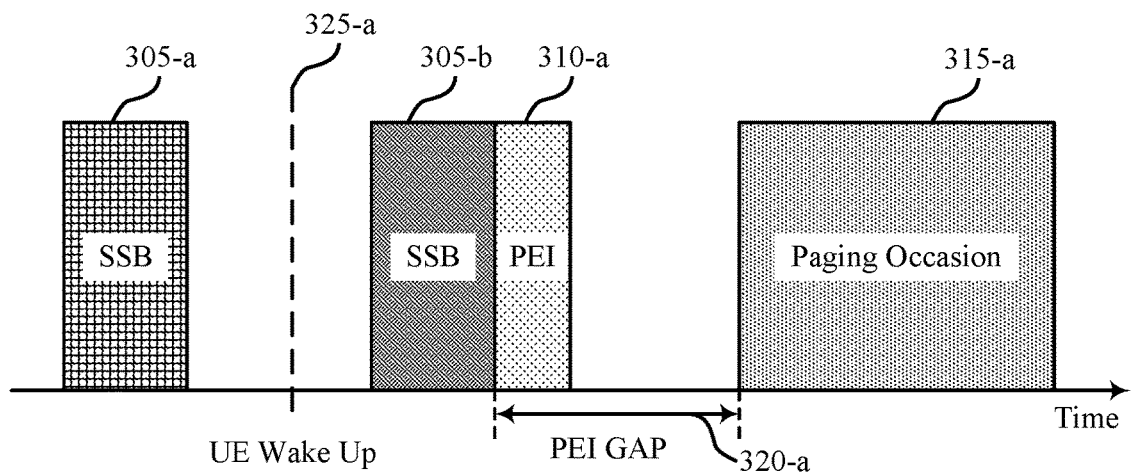
FIGS. 3A and 3B illustrate examples of paging timelines that support UE assistance for paging procedures in accordance with aspects of the present disclosure.
Figure 3B:
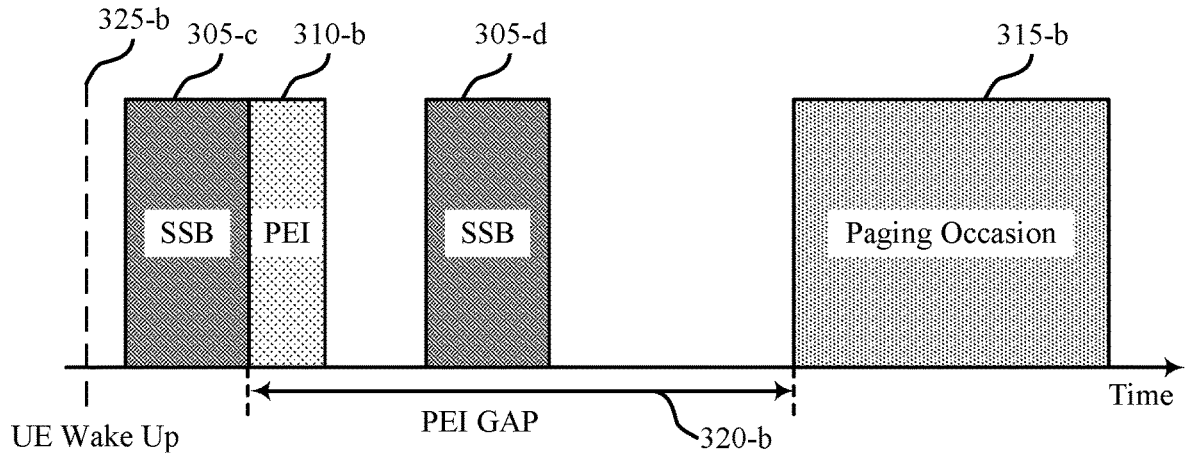

FIGS. 3A and 3B illustrate examples of paging timelines 300-a and 300-b that support UE assistance for paging procedures in accordance with aspects of the present disclosure. In some examples, paging timelines 300-a and 300-b may implement aspects of the wireless communications systems 100 and 200, as described with reference to FIGS. 1 and 2. For example, paging timelines 300-a and 300-b may illustrate timings for paging transmissions between a base station 105 and a UE 115. The paging transmissions may include SSBs 305 (e.g., downlink reference signals), PEIs 310, and paging occasions 315 (e.g., paging messages transmitted via the paging occasions 315). The paging timelines 300 may illustrate different PEI gaps 320 for the UE 115 based on a link quality of the UE 115, as described with reference to FIG. 2.

The UE 115 may be an example of UEs 115-a and 115-b, as described with reference to FIG. 2. For example, the UE 115 may be configured with a DRX cycle (e.g., paging cycle), and the UE 115 may operate in an RRC idle or RRC inactive mode (e.g., an inactive state) during some or all of paging timelines 300-a and 300-b. The DRX cycle may indicate when the UE 115 may wake up (e.g., from a sleep mode or a low power state) to monitor for a paging message within a paging occasion 315 that is configured for the UE 115, as described with reference to FIG. 2. In some cases, the UE 115 may wake up to monitor one or more downlink reference signals, such as the SSBs 305, prior to the configured paging occasion 315 for the UE 115. In some examples, the downlink reference signals may be TRSs, CSI-RSs, or both, that may be configured for the UE 115 to use in a paging procedure for the UE 115. The UE 115 may sample the SSBs 305 (e.g., measure a RSRP level of the SSBs 305 or other downlink reference signals) to tune to the network and to obtain channel parameters and other channel quality information that may enable the UE 115 to accurately decode a forthcoming paging message within the paging occasion 315. The number of SSBs 305 that the UE 115 may sample to obtain sufficient channel parameters may be based on a link quality of the UE 115.

The UE 115 may measure a RSRP level associated with one or more SSBs 305 to determine the link quality of the UE 115. In some examples, UE 115 may measure the RSRP after waking up from a sleep mode. Additionally, or alternatively, the UE 115 may measure the RSRP during the sleep mode, or during a previous wake or sleep duration of the DRX cycle. The link quality may indicate (e.g., via a pre-configured correspondence table, or some other configured indication) a number of SSBs 305 that the UE 115 may sample to obtain paging channel parameters and other channel quality information for accurately decoding a paging message. In some examples, the number of SSBs 305 (e.g., or other downlink reference signals) may be based on a link quality threshold. A UE 115 with a relatively high link quality (e.g., exceeding the link quality threshold) may sample fewer SSBs 305 (e.g., one or zero SSBs 305) than a UE 115 with a relatively poor link quality (e.g., falling below the link quality threshold). As such, a UE 115 with a relatively high link quality may wake up closer to the paging occasion 315 (e.g., at 325-a within paging timeline 300-a) than a UE 115 with a relatively low link quality (e.g., at 325-b within paging timeline 300-b).

In some cases, as illustrated in the paging timelines 300, a base station 105 may transmit a PEI 310 to the UE 115 to indicate whether the UE 115 is to receive a paging message within the corresponding paging occasion 315. As described with reference to FIG. 2, the PEI 310 may be transmitted via dedicated signaling such that the UE 115 may consume less power to receive and decode the PEI 310 than the UE 115 may use for receiving paging DCI, paging messages, or both. The UE 115 may sample one or more SSBs 305 prior to receiving the PEI 310. In some examples, a time period between the PEI 310 and the corresponding paging occasion 315 may be relatively long (e.g., one or more seconds, or some other duration), and channel conditions for the UE 115 may change during the time period. As such, if the PEI 310 indicates a paging message for the UE 115 within the paging occasion 315, the UE 115 may sample one or more other SSBs 305 after receiving the PEI 310 to tune to the network and obtain sufficient channel parameters (e.g., associated with the changing channel conditions for the paging channel) for accurately decoding the paging message (e.g., a physical downlink shared channel (PDSCH) message). It may be beneficial to configure a PEI gap for the UE 115 such that the UE 115 may sample enough SSBs to accurately decode the paging message while reducing or minimizing a time that the UE 115 operates in a wake mode, to provide for reduced power consumption by the UE 115 while maintain accurate and reliable communications.

As described herein, a PEI gap 320 (e.g., a preferred PEI gap 320) for the UE 115 may be determined based on the number of SSBs 305 that UE 115 may sample to obtain sufficient channel quality information for decoding a paging message and a periodicity of the SSBs 305 (e.g., the base station 105 may transmit the SSBs 305 according to a configured periodicity). For example, the UE 115 may multiply the number of SSBs 305 by the periodicity to determine a duration (e.g., in seconds, milliseconds, radio frames, or some other time duration) of the PEI gap 320. The UE 115 may indicate the PEI gap 320 to the base station 105 via UAI (e.g., transmitted via an RRC message). The base station 105 may configure a PEI gap 320 based on the UAI and communicate paging messages to the UE 115 according to the configured PEI gap 320. Paging timelines 300-a and 300-b illustrate different durations for a PEI gap 320 that may be supported by or configured for the UE 115.

It is to be understood that while paging timelines 300-a and 300-b illustrate two possible timelines for paging communications between a base station 105 and a UE 115, any duration of a PEI gap 320 may be configured for a UE 115, and any number of SSBs 305 or other reference signals may be transmitted within a given duration. Certain operations or signaling may also be left out of the paging timelines 300, or other operations or signaling may be added or removed.

FIG. 3A illustrates a first paging timeline 300-a. Paging timeline 300-a illustrates reception of a PEI 310-a and a paging message (e.g., during a paging occasion 315-a) by the UE 115 according to a first PEI gap 320-a. In the example of paging timeline 300-a, the UE 115 may be associated with a relatively high link quality. Based on the relatively high link quality, the UE 115 may determine to monitor one SSB 305-b to obtain sufficient channel parameters for accurately decoding a forthcoming paging message. The UE 115 may wake up at 325-a to sample SSB 305-b. The UE 115 may attempt to return to a sleep mode (e.g., a deep sleep mode or a shallow sleep mode) after the UE 115 processes SSB 305-b to reduce power consumption. However, the UE 115 may take a duration of time (e.g., 28 ms, or some other duration) between any transmission or reception by the UE 115 to enter a deep sleep mode (e.g., a maximum power saving mode for the UE 115). If the duration between SSB 305-b and paging occasion 315-a is less than the duration of time for the UE 115 to transition to deep sleep, the UE 115 may transition to a shallow sleep (e.g., the UE 115 may turn off a portion of the circuitry of the UE 115), or the UE 115 may remain in a wake state, which may result in unnecessary power consumption by the UE 115.

Accordingly, it may be desirable for the UE 115 to receive PEI 310-a closer in time to paging occasion 315-a (e.g., the next paging occasion 315 after sampling SSB 305-b), because the remaining time after processing SSB 305-b may not be sufficient for the UE 115 to transition to deep sleep. For example, the UE 115 may wake up at 325-a to receive and measure SSB 305-b, and the UE 115 may subsequently receive PEI 310-a and monitor for a paging message within paging occasion 315-a according to PEI gap 320-a. The UE 115 may remain in a wake state or a shallow sleep state during PEI gap 320-a. Thus, PEI gap 320-a may be configured to allow for the UE 115 to sample a sufficient number of SSBs 305 (e.g., one SSB 305-b) and to reduce or minimize an amount of time the UE 115 may operate in a wake state or a shallow sleep state.

The UE 115 may thereby determine a PEI gap 320 that is supported by the UE 115 (e.g., a preferred PEI gap 320) based on the link quality of the UE 115 (e.g., a number of SSBs 305 that the UE 115 may monitor, such as one SSB 305-b in the example of paging timeline 300-a), a duration of time for the UE 115 to enter a deep sleep mode between receiving signaling, or both. The UE 115 may indicate the determined PEI gap 320 to the base station 105 via UAI. For example, the UE 115 may establish an RRC connection with the base station 105 and transition from the inactive state (e.g., RRC idle or RRC inactive) to an active state (e.g., an RRC connected mode) to transmit the UAI indicating the updated link quality for the UE 115.

The base station 105 may receive the UAI and configure the UE 115 with configured PEI gap 320-a based on the indicated PEI gap. A duration of configured PEI gap 320-a may be based on (e.g., the same as or different from) the PEI gap 320 indicated via the UAI. The base station 105 may transmit PEI 310-a and a paging message within paging occasion 315-a according to configured PEI gap 320-a. By transmitting a PEI and corresponding paging message based on a supported PEI gap 320 (e.g., based on a link quality of the UE 115), the base station 105 may allow for the UE 115 to reduce power consumption while obtaining sufficient channel quality information to accurately decode the paging message.

FIG. 3B illustrates a second paging timeline 300-b. Paging timeline 300-b illustrates reception of a PEI 310-b and a paging message (e.g., during a paging occasion 315-b) by a UE 115 according to a second PEI gap 320-b that may be longer than the first PEI gap 320-a. In some examples, if the UE 115 receives a paging message according to paging timeline 300-a, and the UE 115 moves within the network (e.g., changes locations, changes cells, or the like), the link quality of the UE 115 can change. The UE 115 may transmit UAI to the network to indicate the change in link quality and a corresponding PEI gap 320 that is supported by the UE 115 based on the updated link quality, and the network may configure a second PEI gap 320-b for the UE 115 accordingly.

As such, in the example of paging timeline 300-b, the UE 115 may be associated with a relatively low link quality (e.g., lower than the link quality of the UE 115 during paging timeline 300-a). Based on the link quality, the UE 115 may determine to monitor two SSBs 305-c and 305-d to obtain sufficient channel parameters for accurately decoding a forthcoming paging message. The PEI gap 320-b may be longer than the PEI gap 320-a to provide adequate time for the UE 115 to sample two SSBs 305-c and 305-d before paging occasion 315-b (e.g., instead of one SSB 305-b in paging timeline 300-a).

The UE 115 may wake up at 325-b to monitor SSB 305-c. The UE 115 may attempt to return to a sleep mode (e.g., a deep sleep mode or a shallow sleep mode) after the UE 115 processes SSB 305-c to reduce power consumption. However, if the duration between SSB 305-c and SSB 305-d is less than the duration of time for the UE 115 to transition to deep sleep, the UE 115 may transition to a shallow sleep (e.g., the UE 115 may turn off a portion of the circuitry of the UE 115), or the UE 115 may remain in a wake state, which may increase power consumption by the UE 115.

Accordingly, the UE 115 may support a longer PEI gap 320 than PEI gap 320-a, such that the UE 115 may sample one or more other SSBs 305 between PEI 310-b and the corresponding paging occasion 315-b. The longer PEI gap 320 may additionally, or alternatively, provide sufficient time for the UE 115 to enter a deep sleep mode before paging occasion 315-b.

The UE 115 may thereby determine a PEI gap 320 that is supported by the UE 115 (e.g., a preferred PEI gap 320) based on the link quality of the UE 115 (e.g., a number of SSBs 305 that the UE 115 may monitor, such as two SSBs 305-c and 305-d in the example of paging timeline 300-b), a duration of time for the UE 115 to enter a deep sleep mode between receiving signaling, or both. The UE 115 may indicate the determined PEI gap 320 to the base station 105 via UAI.

The base station 105 may receive the UAI and configure the UE 115 with a configured PEI gap 320-b based on the indicated PEI gap. A duration of configured PEI gap 320-b may be based on (e.g., the same as or different from) the PEI gap 320 indicated via the UAI. The base station 105 may transmit PEI 310-b and a paging message within paging occasion 315-b according to configured PEI gap 320-b. The UE 115 may wake up at 325-b, sample SSB 305-c, receive PEI 310-b, sample SSB 305-d, and monitor paging occasion 315-b for the paging message. The UE 115 may transition from the wake state to a sleep state (e.g., deep sleep) between respective signaling if a duration between adjacent signals is greater than a duration for the UE 115 to transition to a deep sleep state. If the duration between signals is less than the duration for the UE 115 to transition to the deep sleep state, the UE 115 may transition to a shallow sleep state or remain in the wake state.

By transmitting a PEI 310 and corresponding paging message based on a supported PEI gap 320 (e.g., based on a link quality of the UE 115), the base station 105 may allow for the UE 115 to reduce power consumption while obtaining sufficient channel quality information to accurately decode the paging message.

Figure 4:
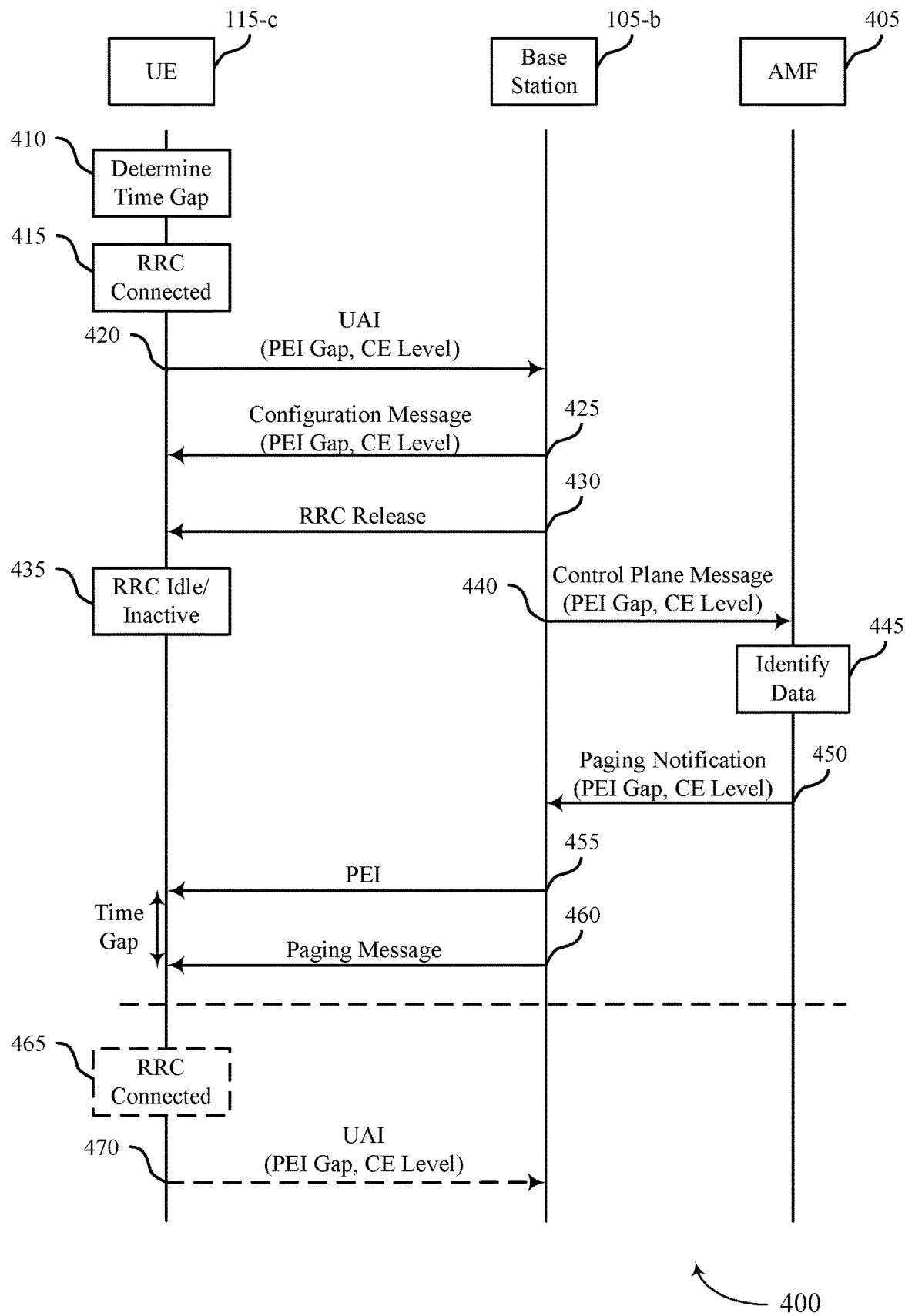
FIG. 4 illustrates an example of a process flow that supports UE assistance for paging procedures in accordance with aspects of the present disclosure.

FIG. 4 illustrates an example of a process flow 400 that supports UE assistance for paging procedures in accordance with aspects of the present disclosure. The process flow 400 may implement various aspects of the present disclosure described with reference to FIGS. 1-3. The process flow 400 may include UE 115-c and base station 105-b, which may be examples of UEs 115 and base stations 105 as described with reference to FIGS. 1-3. The process flow 400 may include AMF 405, which may be an example of a network node as described with reference to FIGS. 1 and 2. UE 115-c may determine a PEI gap (e.g., a time gap) for UE 115-c to obtain accurate channel parameters for receiving a paging message based on a link quality of UE 115-c. UE 115-c may indicate the time gap to base station 105-b via UAI. Base station 105-b may determine a configured time gap based on the UAI and may transmit the PEI and paging message to UE 115-c according to the configured time gap, which may provide for UE 115-c to accurately receive and decode the paging message.

In the following description of the process flow 400, the operations between UE 115-c, base station 105-b, and the AMF 405 may be performed in different orders or at different times. Certain operations may also be left out of the process flow 400, or other operations may be added. It is to be understood that while UE 115-c is shown communicating with base station 105-b, any number of UEs 115 or other devices may transmit UAI and receive configured PEI gaps from a base station 105, an AMF 405, or another network entity.

At 410, UE 115-c may determine a time gap between a PEI for UE 115-c and a paging message for UE 115-c that corresponds to the PEI. UE 115-c may determine the time gap based on a link quality of UE 115-c. For example, UE 115-c may determine a number of downlink reference signals (e.g., SSBs) that UE 115-c may measure to identify parameters and other channel quality information used to accurately decode a forthcoming paging message. If UE 115-c includes a relatively good link quality, UE 115-c will decode fewer downlink reference signals than if UE 115-c includes a relatively poor link quality. The downlink reference signals may be transmitted periodically, and UE 115-c may determine the time gap based on the number of downlink reference signals and the periodicity of the downlink reference signals.

At 415, UE 115-*c* may establish an RRC connection with a network. UE 115-*c* may enter an active state (e.g., an RRC active or RRC connected state) based on establishing the RRC connection. In some examples, UE 115-*c* may enter the active state prior to determining the time gap. Additionally or alternatively, UE 115-*c* may enter the active state after determining the time gap, or concurrently with the determination of the time gap.

At 420, UE 115-*c* may transmit UAI to base station 105-*b*. The UAI may include an indication of the determined time gap (e.g., PEI gap or WUS gap), a CE level supported by UE 115-*c*, or both. The UAI may be transmitted via an RRC message while UE 115-*c* is in the active state.

At 425, UE 115-*c* may receive a configuration message (e.g., an RRC reconfiguration message) from base station 105-*b*. The configuration message may indicate a configured time gap (e.g., PEI gap) for UE 115-*c*, a configured CE level for UE 115-*c*, or both, based on the UAI. The configured time gap for UE 115-*c* may be the same as or different from the determined time gap for UE 115-*c*. Base station 105-*b* may determine the configured time gap for UE 115-*c* based on scheduling information (e.g., preferred PEI gaps) for UE 115-*c* and one or more other UEs 115.

At 430, UE 115-*c* may receive an RRC release message from base station 105-*b*. Base station 105-*b* may release UE 115-*c* based on configuring UE 115-*c* with the configured time gap, based on terminating another data session, for another reason, or a combination thereof (e.g., base station 105-*b* may determine when to transmit the RRC release message). At 440, UE 115-*c* may transition from the active state to an inactive state, such as an RRC idle or RRC inactive state, based on receiving the RRC release message.

At 435, base station 105-*b* may transmit a control plane message (e.g., a N2 release message) to the AMF 405 (e.g., a network node). The control plane message may indicate the configured time gap for UE 115-*c*, the configured CE level for UE 115-*c*, or both. In some examples, the AMF 405 may store the configured time gap, the configured CE level, other information, or a combination thereof, for UE 115-*c* and one or more other UEs 115.

At 445, the AMF 405 may identify new data for UE 115-*c*. At 450, the AMF 405 may transmit a paging notification message to base station 105-*b*. The paging notification message may indicate a paging message to be transmitted to UE 115-*c* based on the new data for UE 115-*c*. Additionally or alternatively, the paging message may indicate the configured time gap for UE 115-*c*, the configured CE level for UE 115-*c*, or both.

At 455, base station 105-*b* may transmit the PEI to UE 115-*c* (e.g., according to the configured time gap and the configured CE level for UE 115-*c*). At 460, base station 105-*b* may transmit the paging message to UE 115-*c* during a paging occasion according to the configured time gap (e.g., and the configured CE level). In some examples, the paging message may be transmitted via a paging channel (e.g., a PDCCH or a PDSCH). Base station 105-*b* may determine the paging occasion based on a hashing function that may include the configured time gap for UE 115-*c*, the configured CE level for UE 115-*c*, an ID of UE 115-*c*, or a combination thereof. UE 115-*c* may monitor the paging occasion of the paging channel for the paging message according to the configured time gap.

In some examples, at 465, UE 115-*c* may establish a second RRC connection with the network (e.g., or re-establish the RRC connection). UE 115-*c* may establish the second RRC connection to perform a data transmission or reception. Additionally or alternatively, UE 115-*c* may determine a change in link quality, and UE 115-*c* may establish the second RRC connection to transmit an indication of the updated link quality of UE 115-*c* to the network.

At 470, in some examples, UE 115-*c* may transmit UAI to base station 105-*b*. UE 115-*c* may transmit the UAI via an RRC message while in the active state. The UAI may indicate an updated PEI gap for UE 115-*c*, an updated CE level for UE 115-*c*, or both. In some examples, base station 105-*b* may configure UE 115-*c* with a new configured PEI gap based on the updated UAI and may transmit the PEI and paging message according to the new configured PEI gap.

Figure 5:
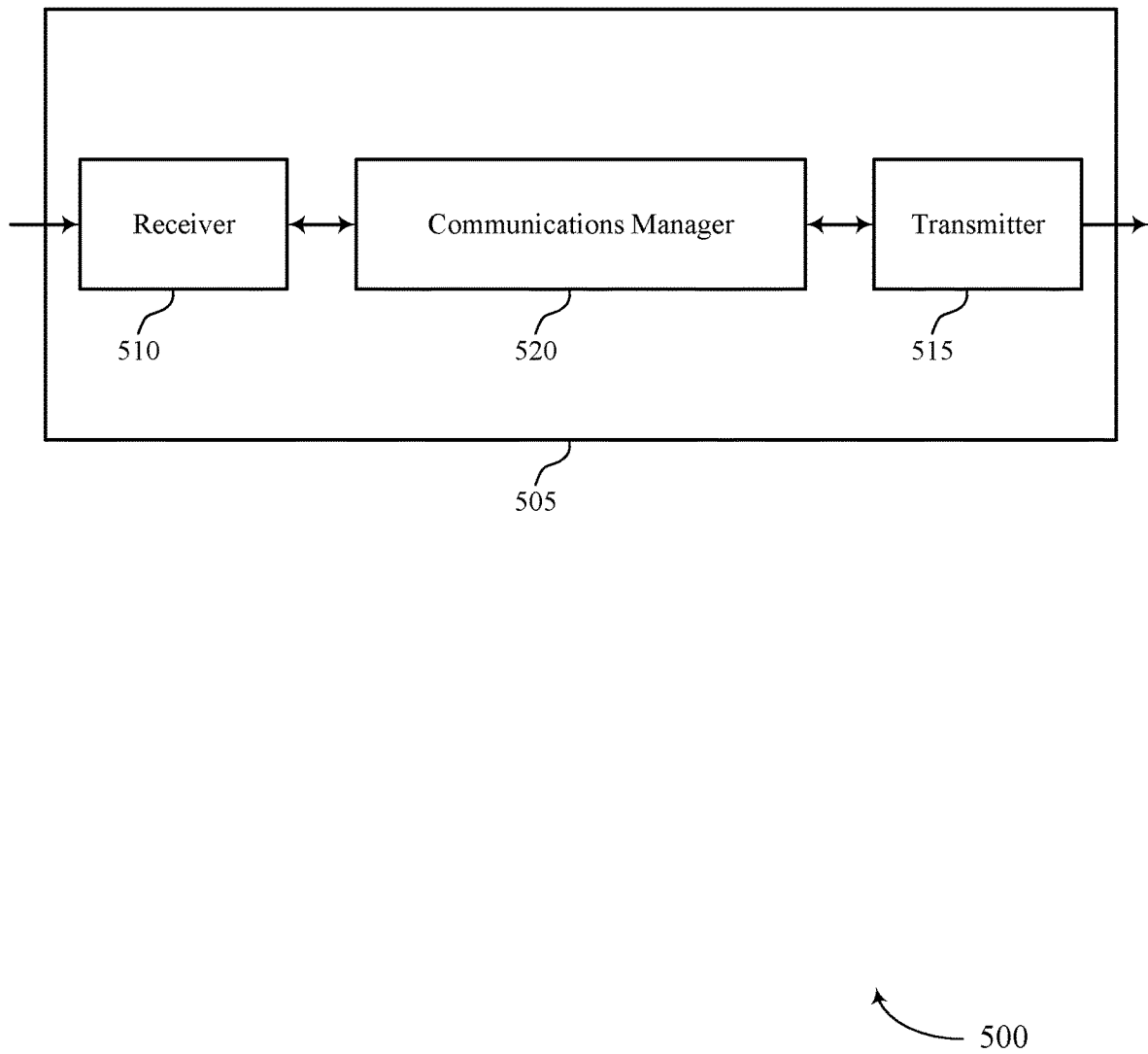
FIGS. 5 and 6 show block diagrams of devices that support UE assistance for paging procedures in accordance with aspects of the present disclosure.

FIG. 5 shows a block diagram 500 of a device 505 that supports UE assistance for paging procedures in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to UE assistance for paging procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE assistance for paging procedures). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of UE assistance for paging procedures as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for determining, based on a link quality of the UE, a time gap between a PEI for the UE and a paging message for the UE that corresponds to the PEI. The communications manager 520 may be configured as or otherwise support a means for transmitting, by the UE in an active state, UAI to a base station, the UAI including an indication of the time gap. The communications manager 520 may be configured as or otherwise support a means for receiving, from the base station, a configuration message indicating a configured time gap for the UE based on the indication of the time gap. The communications manager 520 may be configured as or otherwise support a means for receiving, by the UE in an inactive state, the PEI via a paging channel. The communications manager 520 may be configured as or otherwise support a means for monitoring, in the inactive state, a paging occasion of the paging channel for the paging message according to the configured time gap.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources. The device 505 (e.g., a UE 115) may transmit UAI to indicate a link quality, CE level, and PEI gap supported by the device 505, and a base station may configure a PEI gap and CE level for the device 505, which may provide sufficient time for a processor of the device 505 to sample reference signals, transition back to a deep sleep state, or both, between receiving a PEI and monitoring for a paging message within a paging occasion. For example, the configured PEI gap (e.g., that is based on a link quality of the device 505) may reduce processing by reducing or minimizing a duration of time in which the processor of the device 505 is turned on (e.g., in a wake mode), and optimizing or increasing durations of time in which the processor of the device 505 may turn off (e.g., enter a deep sleep mode), which may reduce power consumption by the device 505. Additionally, or alternatively, by sampling a number of reference signals within the configured PEI gap that is based on the link quality of the device 505, the processor may refrain from sampling unnecessary reference signals, which may reduce processing and provide for more efficient utilization of communication resources.

Figure 6:
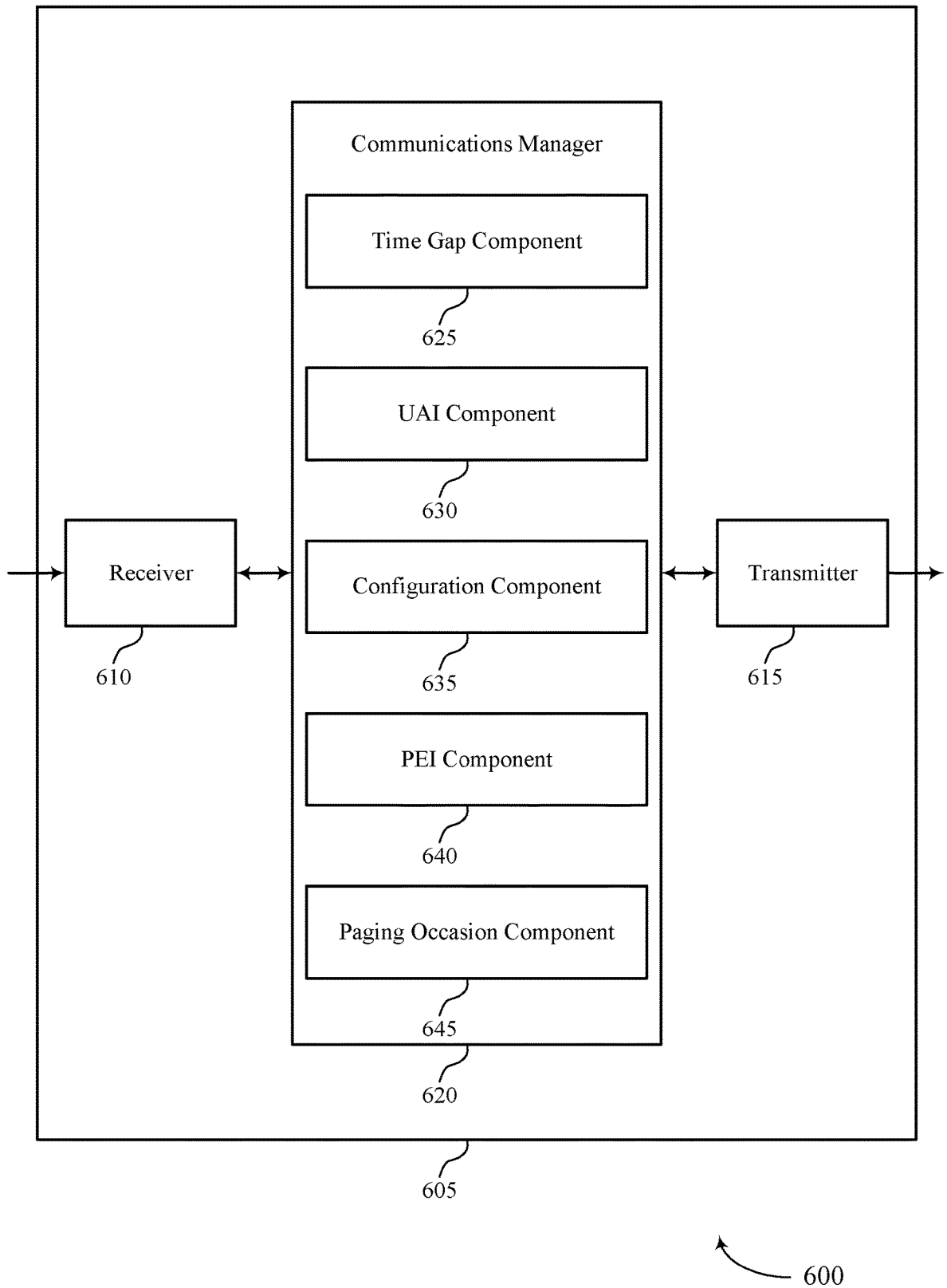

FIG. 6 shows a block diagram 600 of a device 605 that supports UE assistance for paging procedures in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE assistance for paging procedures). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE assistance for paging procedures). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of UE assistance for paging procedures as described herein. For example, the communications manager 620 may include a time gap component 625, a UAI component 630, a configuration component 635, a PEI component 640, a paging occasion component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The time gap component 625 may be configured as or otherwise support a means for determining, based on a link quality of the UE, a time gap between a PEI for the UE and a paging message for the UE that corresponds to the PEI. The UAI component 630 may be configured as or otherwise support a means for transmitting, by the UE in an active state, UAI to a base station, the UAI including an indication of the time gap. The configuration component 635 may be configured as or otherwise support a means for receiving, from the base station, a configuration message indicating a configured time gap for the UE based on the indication of the time gap. The PEI component 640 may be configured as or otherwise support a means for receiving, by the UE in an inactive state, the PEI via a paging channel. The paging occasion component 645 may be configured as or otherwise support a means for monitoring, in the inactive state, a paging occasion of the paging channel for the paging message according to the configured time gap.

Figure 7:
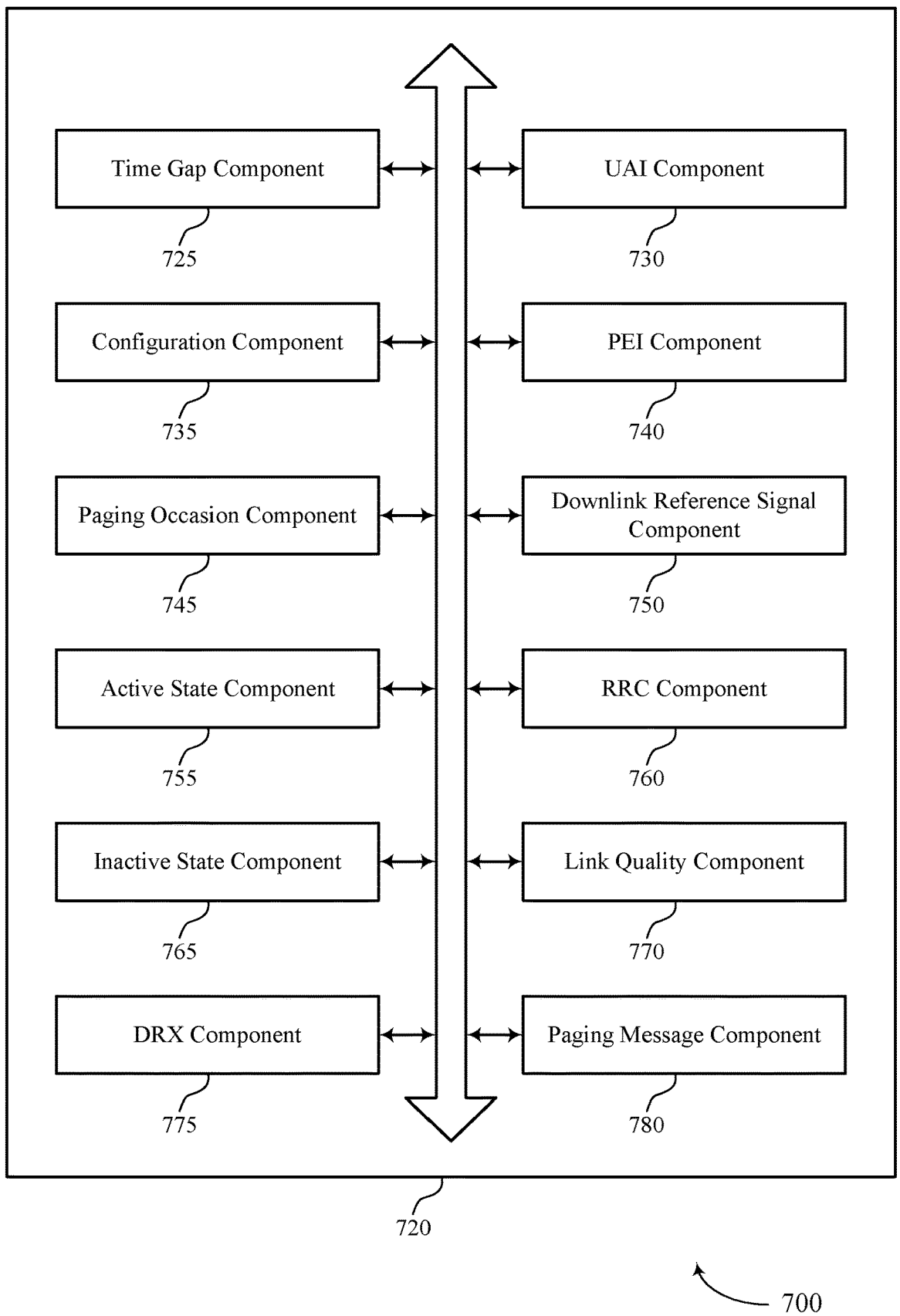
FIG. 7 shows a block diagram of a communications manager that supports UE assistance for paging procedures in accordance with aspects of the present disclosure.

FIG. 7 shows a block diagram 700 of a communications manager 720 that supports UE assistance for paging procedures in accordance with aspects of the present disclosure. The communications manager 720 may be an example of aspects of a communications manager 520, a communications manager 620, or both, as described herein. The communications manager 720, or various components thereof, may be an example of means for performing various aspects of UE assistance for paging procedures as described herein. For example, the communications manager 720 may include a time gap component 725, a UAI component 730, a configuration component 735, a PEI component 740, a paging occasion component 745, a downlink reference signal component 750, an active state component 755, an RRC component 760, an inactive state component 765, a link quality component 770, a DRX component 775, a paging message component 780, or any combination thereof. Each of these components may communicate, directly or indirectly, with one another (e.g., via one or more buses).

The communications manager 720 may support wireless communications at a UE in accordance with examples as disclosed herein. The time gap component 725 may be configured as or otherwise support a means for determining, based on a link quality of the UE, a time gap between a PEI for the UE and a paging message for the UE that corresponds to the PEI. The UAI component 730 may be configured as or otherwise support a means for transmitting, by the UE in an active state, UAI to a base station, the UAI including an indication of the time gap. The configuration component 735 may be configured as or otherwise support a means for receiving, from the base station, a configuration message indicating a configured time gap for the UE based on the indication of the time gap. The PEI component 740 may be configured as or otherwise support a means for receiving, by the UE in an inactive state, the PEI via a paging channel. The paging occasion component 745 may be configured as or otherwise support a means for monitoring, in the inactive state, a paging occasion of the paging channel for the paging message according to the configured time gap.

In some examples, the paging occasion component 745 may be configured as or otherwise support a means for determining a paging frame for the paging occasion for the UE based on an ID of the UE and the configured time gap. In some examples, the paging occasion component 745 may be configured as or otherwise support a means for determining an index for the paging occasion within the paging frame for the UE based on the configured time gap.

In some examples, the downlink reference signal component 750 may be configured as or otherwise support a means for identifying a number of measurements of downlink reference signals for obtaining channel quality information for the paging channel, where the number of measurements of the downlink reference signals is based on the link quality of the UE. In some examples, the time gap component 725 may be configured as or otherwise support a means for determining the time gap based on the number of the downlink reference signals and a periodicity associated with the downlink reference signals.

In some examples, the downlink reference signal component 750 may be configured as or otherwise support a means for decoding, during the configured time gap after receiving the PEI, the downlink reference signals. In some examples, the downlink reference signal component 750 may be configured as or otherwise support a means for determining the channel quality information for the paging channel based on decoding the downlink reference signals. In some examples, the paging message component 780 may be configured as or otherwise support a means for decoding the paging message based on the channel quality information for the paging channel. In some examples, the downlink reference signals may include SSBs, TRSs, CSI-RSs, or any combination thereof.

In some examples, the active state component 755 may be configured as or otherwise support a means for transitioning to the active state before transmitting the UAI, where the active state is an RRC connected state. In some examples, the RRC component 760 may be configured as or otherwise support a means for receiving, from the base station, a release message. In some examples, the inactive state component 765 may be configured as or otherwise support a means for transitioning to the inactive state based on the release message, where the inactive state is an RRC inactive state or an RRC idle state.

In some examples, the link quality component 770 may be configured as or otherwise support a means for determining a change in the link quality of the UE. In some examples, the active state component 755 may be configured as or otherwise support a means for transitioning from the inactive state to the active state. In some examples, the UAI component 730 may be configured as or otherwise support a means for transmitting, to the base station, second UAI indicating a second time gap for the UE based on the change in the link quality of the UE.

In some examples, the PEI component 740 may be configured as or otherwise support a means for receiving, via the PEI, an indication of the paging message for the UE. In some examples, the DRX component 775 may be configured as or otherwise support a means for transitioning from a sleep mode of a DRX cycle to a wake mode of the DRX cycle for the paging occasion based on the indication of the paging message. In some examples, the DRX component 775 may be configured as or otherwise support a means for monitoring the paging occasion for the paging message based on transitioning to the wake mode of the DRX cycle.

In some examples, the UAI component 730 may be configured as or otherwise support a means for transmitting, to the base station via the UAI, a CE level supported by the UE. In some examples, the configuration component 735 may be configured as or otherwise support a means for receiving, from the base station via the configuration message, a configured CE level for the UE. In some examples, the paging occasion component 745 may be configured as or otherwise support a means for receiving the PEI and the paging message according to the configured CE level. In some examples, the paging occasion component 745 may be configured as or otherwise support a means for determining a paging frame for the paging occasion for the UE based on the configured CE level.

In some examples, the downlink reference signal component 750 may be configured as or otherwise support a means for receiving one or more reference signals from the base station. In some examples, the downlink reference signal component 750 may be configured as or otherwise support a means for measuring a signal parameter of the one or more reference signals received by the UE. In some examples, the link quality component 770 may be configured as or otherwise support a means for determining the link quality of the UE based on the measured signal parameter.

In some examples, the UAI component 730 may be configured as or otherwise support a means for transmitting the UAI to the base station via an RRC message. In some examples, the configuration component 735 may be configured as or otherwise support a means for receiving the configuration message from the base station in response to the UAI, where the configuration message is an RRC reconfiguration message.

In some examples, to support determining the time gap, the time gap component 725 may be configured as or otherwise support a means for determining the time gap to be a first time gap less than a second time gap based on the link quality exceeding a link quality threshold.

Figure 8:
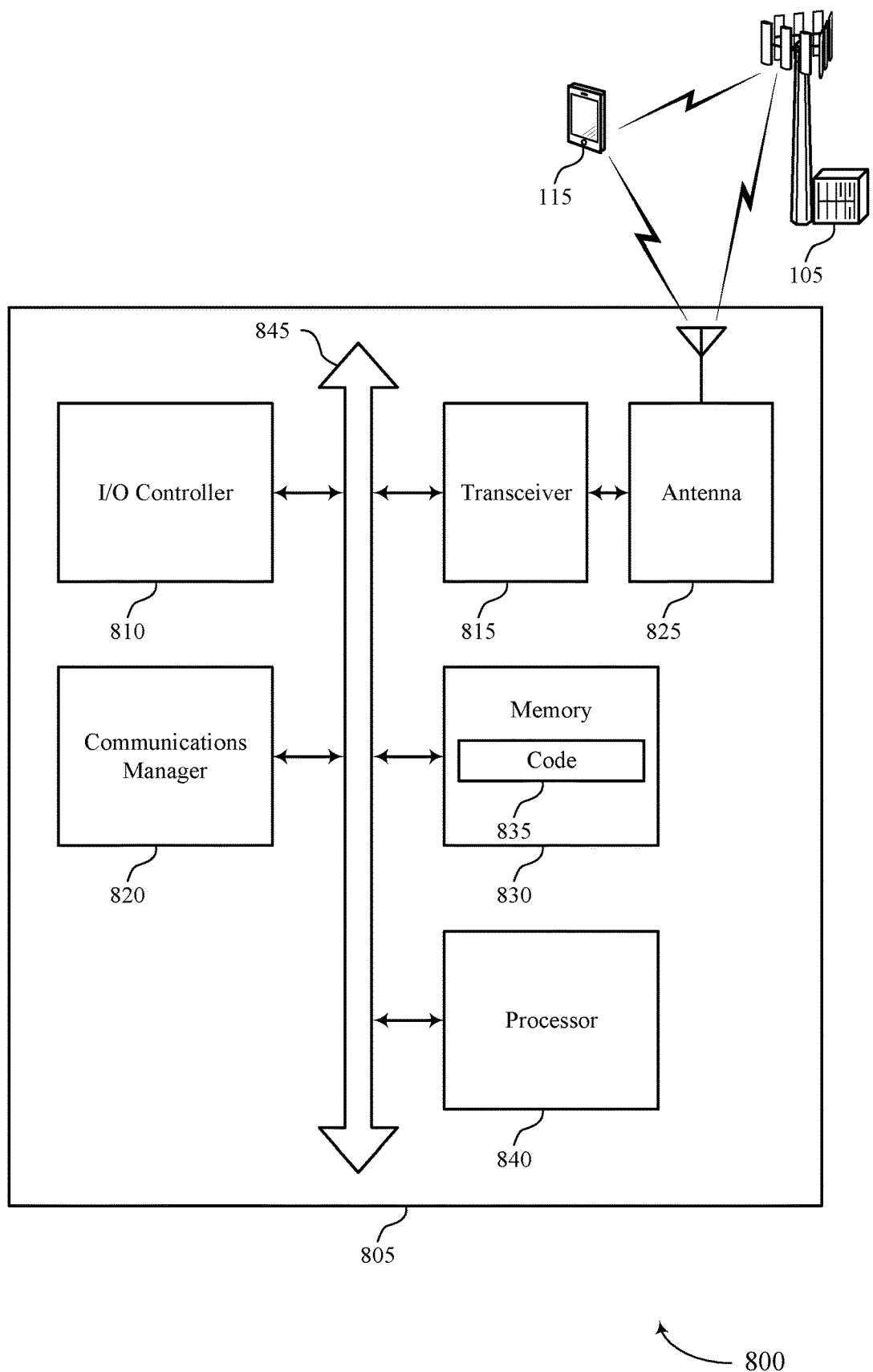
FIG. 8 shows a diagram of a system including a device that supports UE assistance for paging procedures in accordance with aspects of the present disclosure.

FIG. 8 shows a diagram of a system 800 including a device 805 that supports UE assistance for paging procedures in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting UE assistance for paging procedures). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for determining, based on a link quality of the UE, a time gap between a PEI for the UE and a paging message for the UE that corresponds to the PEI. The communications manager 820 may be configured as or otherwise support a means for transmitting, by the UE in an active state, UAI to a base station, the UAI including an indication of the time gap. The communications manager 820 may be configured as or otherwise support a means for receiving, from the base station, a configuration message indicating a configured time gap for the UE based on the indication of the time gap. The communications manager 820 may be configured as or otherwise support a means for receiving, by the UE in an inactive state, the PEI via a paging channel. The communications manager 820 may be configured as or otherwise support a means for monitoring, in the inactive state, a paging occasion of the paging channel for the paging message according to the configured time gap.

By including or configuring the communications manager 820 in accordance with examples as described herein, the device 805 may support techniques for improved communication reliability, reduced latency, reduced power consumption, improved coordination between devices, and longer battery life. For example, by transmitting UAI to a base station 105 or other network entity to indicate a link quality of the device 805, the device 805 may improve coordination between devices and improve reliability of communications between the network and the device 805. Additionally or alternatively, the device 805 may transition to an RRC inactive or idle state after transmitting the UAI, which may reduce power consumption and increase battery life. The device 805 may be configured with a DRX cycle for paging, and the device 805 may remain in a sleep state until the device 805 is to monitor a configured paging occasion or until the device 805 receives a PEI indicating a paging message for the device 805. By operating according to the DRX cycle, the device 805 may reduce power consumption and improve battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of UE assistance for paging procedures as described herein, or the processor 840 and the memory 830 may be otherwise configured to perform or support such operations.

Figure 9:
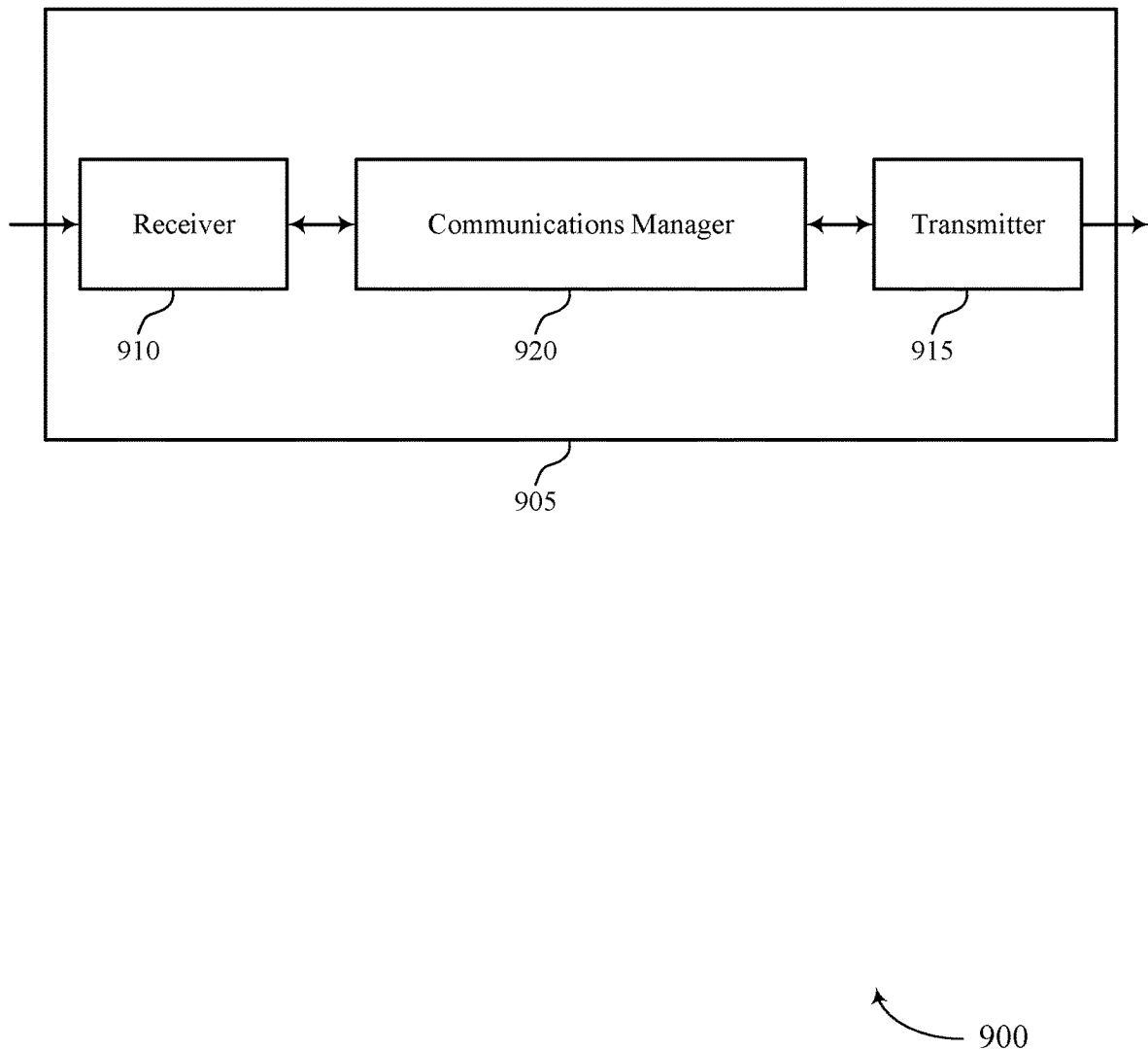
FIGS. 9 and 10 show block diagrams of devices that support UE assistance for paging procedures in accordance with aspects of the present disclosure.

FIG. 9 shows a block diagram 900 of a device 905 that supports UE assistance for paging procedures in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to UE assistance for paging procedures). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to UE assistance for paging procedures). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of UE assistance for paging procedures as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, UAI including an indication of a time gap between a PEI for the UE and a paging message for the UE that corresponds to the PEI. The communications manager 920 may be configured as or otherwise support a means for transmitting, to the UE, a configuration message indicating a configured time gap for the UE based on the indication of the time gap. The communications manager 920 may be configured as or otherwise support a means for transmitting, to the UE, the PEI via a paging channel. The communications manager 920 may be configured as or otherwise support a means for transmitting, to the UE, the paging message during a paging occasion according to the configured time gap.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and more efficient utilization of communication resources. The device 905 (e.g., a base station 105) may transmit a control plane (e.g., N2 release) message to an AMF to indicate a configured PEI gap for one or more UEs 115, which may provide for improved communication between the network and the device 905. The device 905 may receive a paging notification message from the network indicating new data for a UE 115 and a configured PEI gap and CE level for the UE 115. Accordingly, a processor of the device 905 may reduce processing by preparing a paging message for the UE 115 according to the configured PEI gap and CE level (e.g., instead of receiving UAI and determining a configured PEI gap and CE level for the UE 115). By receiving the indication of the configured PEI gap and CE level within the paging notification message, the processor of the device 905 may support more efficient utilization of communication resources.

Figure 10:
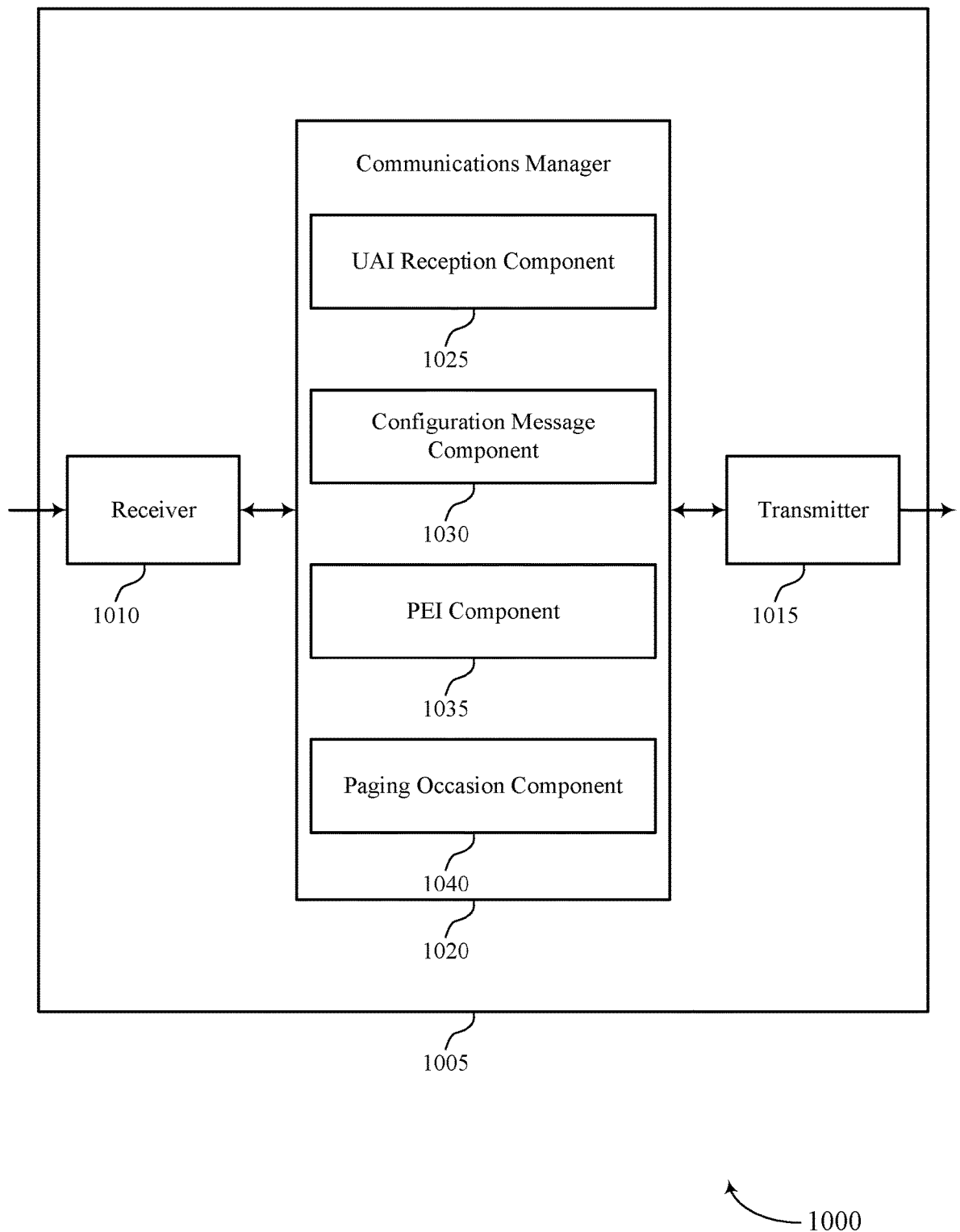

FIG. 10 shows a block diagram 1000 of a device 1005 that supports UE assistance for paging procedures in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to UE assistance for paging procedures). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to UE assistance for paging procedures). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of UE assistance for paging procedures as described herein. For example, the communications manager 1020 may include a UAI reception component 1025, a configuration message component 1030, a PEI component 1035, a paging occasion component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The UAI reception component 1025 may be configured as or otherwise support a means for receiving, from a UE, UAI including an indication of a time gap between a PEI for the UE and a paging message for the UE that corresponds to the PEI. The configuration message component 1030 may be configured as or otherwise support a means for transmitting, to the UE, a configuration message indicating a configured time gap for the UE based on the indication of the time gap. The PEI component 1035 may be configured as or otherwise support a means for transmitting, to the UE, the PEI via a paging channel. The paging occasion component 1040 may be configured as or otherwise support a means for transmitting, to the UE, the paging message during a paging occasion according to the configured time gap.

Figure 11:
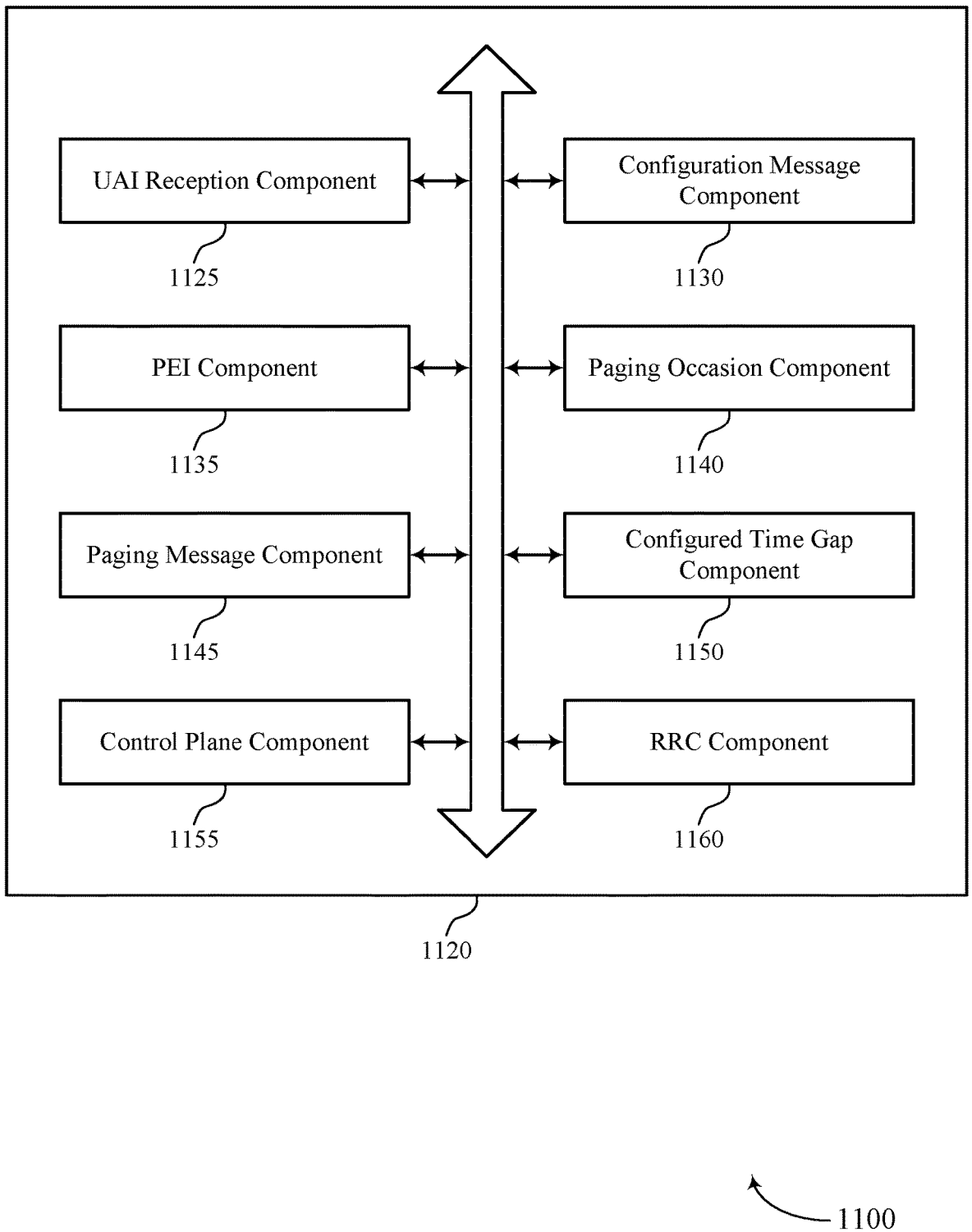
FIG. 11 shows a block diagram of a communications manager that supports UE assistance for paging procedures in accordance with aspects of the present disclosure.

FIG. 11 shows a block diagram 1100 of a communications manager 1120 that supports UE assistance for paging procedures in accordance with aspects of the present disclosure. The communications manager 1120 may be an example of aspects of a communications manager 920, a communications manager 1020, or both, as described herein. The communications manager 1120, or various components thereof, may be an example of means for performing various aspects of UE assistance for paging procedures as described herein. For example, the communications manager 1120 may include a UAI reception component 1125, a configuration message component 1130, a PEI component 1135, a paging occasion component 1140, a paging message component 1145, a configured time gap component 1150, a control plane component 1155, an RRC component 1160, or any combination thereof. Each of these components may communicate, directly or indirectly, with one another (e.g., via one or more buses).

The communications manager 1120 may support wireless communications at a base station in accordance with examples as disclosed herein. The UAI reception component 1125 may be configured as or otherwise support a means for receiving, from a UE, UAI including an indication of a time gap between a PEI for the UE and a paging message for the UE that corresponds to the PEI. The configuration message component 1130 may be configured as or otherwise support a means for transmitting, to the UE, a configuration message indicating a configured time gap for the UE based on the indication of the time gap. The PEI component 1135 may be configured as or otherwise support a means for transmitting, to the UE, the PEI via a paging channel. The paging occasion component 1140 may be configured as or otherwise support a means for transmitting, to the UE, the paging message during a paging occasion according to the configured time gap.

In some examples, the paging occasion component 1140 may be configured as or otherwise support a means for determining the paging occasion for the UE based on a hashing function including an ID of the UE and the configured time gap. In some examples, the paging message component 1145 may be configured as or otherwise support a means for transmitting the paging message during the paging occasion based on the hashing function.

In some examples, the paging occasion component 1140 may be configured as or otherwise support a means for determining the paging occasion for the UE based on a hashing function including a configured CE level for the UE. In some examples, the paging message component 1145 may be configured as or otherwise support a means for transmitting the paging message during the paging occasion based on the hashing function.

In some examples, the configured time gap component 1150 may be configured as or otherwise support a means for determining the configured time gap for the UE based on the indication of the time gap for the UE and scheduling information for one or more other UEs, where the scheduling information is based on one or more other time gaps for the one or more other UEs.

In some examples, the control plane component 1155 may be configured as or otherwise support a means for transmitting, to a network node, a control plane message indicating the configured time gap for the UE. In some examples, the control plane component 1155 may be configured as or otherwise support a means for receiving, from a network node, a paging notification message indicating the paging message for the UE and the configured time gap for the UE.

In some examples, to support transmitting the configuration message, the configuration message component 1130 may be configured as or otherwise support a means for transmitting an RRC reconfiguration message indicating the configured time gap.

In some examples, the UAI reception component 1125 may be configured as or otherwise support a means for receiving, from the UE via the UAI, an indication of a CE level for the UE. In some examples, the configuration message component 1130 may be configured as or otherwise support a means for transmitting, to the UE via the configuration message, a configured CE level for the UE. In some examples, the paging message component 1145 may be configured as or otherwise support a means for transmitting the PEI and the paging message according to the configured CE level.

Figure 12:
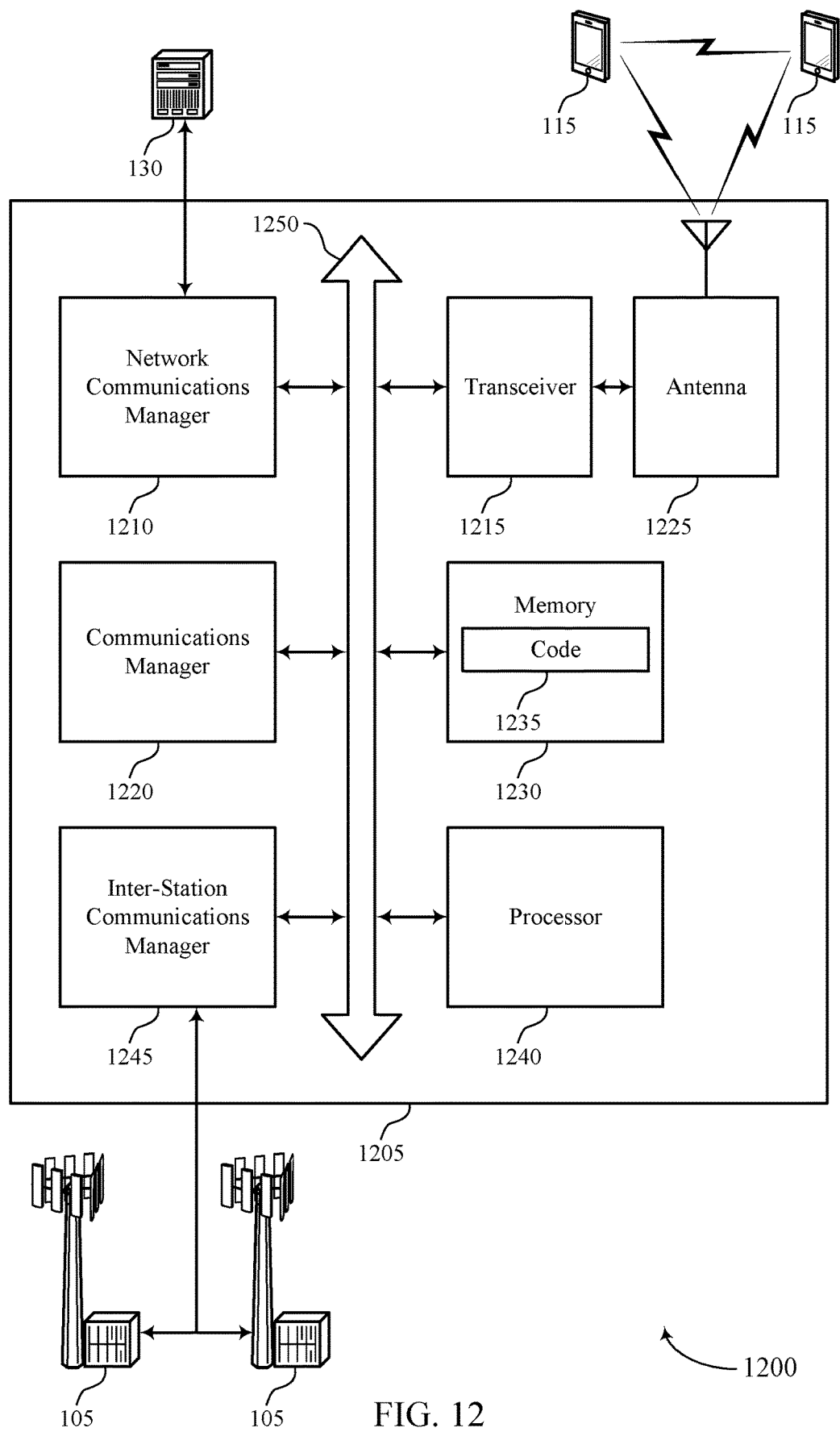
FIG. 12 shows a diagram of a system including a device that supports UE assistance for paging procedures in accordance with aspects of the present disclosure.

FIG. 12 shows a diagram of a system 1200 including a device 1205 that supports UE assistance for paging procedures in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting UE assistance for paging procedures). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, UAI including an indication of a time gap between a PEI for the UE and a paging message for the UE that corresponds to the PEI. The communications manager 1220 may be configured as or otherwise support a means for transmitting, to the UE, a configuration message indicating a configured time gap for the UE based on the indication of the time gap. The communications manager 1220 may be configured as or otherwise support a means for transmitting, to the UE, the PEI via a paging channel. The communications manager 1220 may be configured as or otherwise support a means for transmitting, to the UE, the paging message during a paging occasion according to the configured time gap.

By including or configuring the communications manager 1220 in accordance with examples as described herein, the device 1205 may support techniques for improved communication reliability, reduced latency, and improved coordination between devices. For example, the device 1205 (e.g., a base station 105) may receive UAI from one or more UEs 115 and may configure each UE 115 with a respective PEI gap accordingly. The device 1205 may apply a hashing function that includes an ID of each UE 115 and a configured PEI gap for the respective UE 115 to determine a configured paging occasion for the UE 115, which may provide for the device 1205 to efficiently allocate paging occasions and configured PEI gaps to groups of one or more UEs 115 that prefer similar PEI gaps. The device 1205 may thereby utilize communication resources more efficiently and improve reliability of communications.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of UE assistance for paging procedures as described herein, or the processor 1240 and the memory 1230 may be otherwise configured to perform or support such operations.

Figure 13:
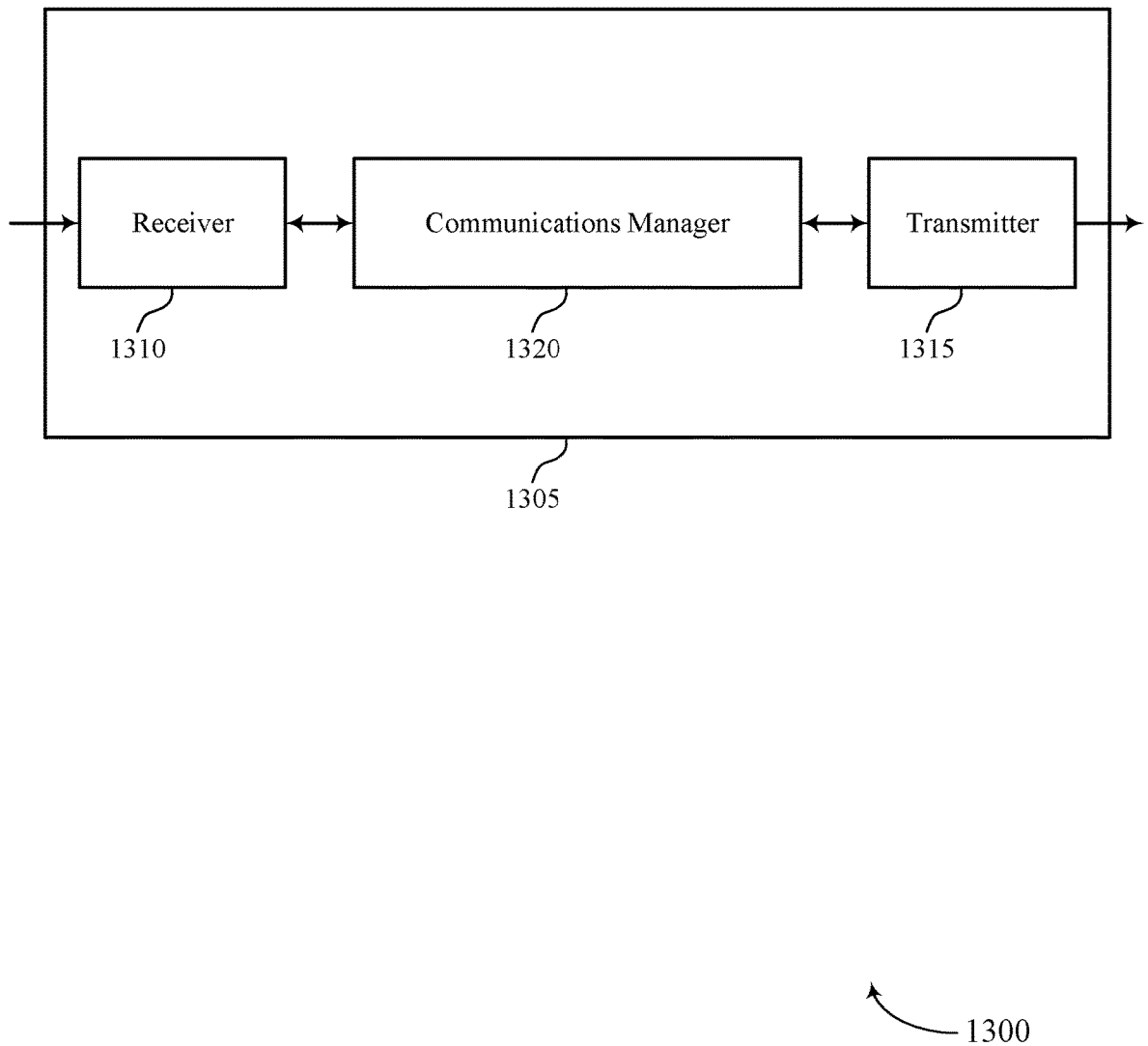
FIGS. 13 and 14 show block diagrams of devices that support UE assistance for paging procedures in accordance with aspects of the present disclosure.

FIG. 13 shows a block diagram 1300 of a device 1305 that supports UE assistance for paging procedures in accordance with aspects of the present disclosure. The device 1305 may be an example of aspects of a network node as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to UE assistance for paging procedures). Information may be passed on to other components of the device 1305. The receiver 1310 may utilize a single antenna or a set of multiple antennas.

The transmitter 1315 may provide a means for transmitting signals generated by other components of the device 1305. The transmitter 1315 may utilize a single antenna or a set of multiple antennas.

The communications manager 1320, the receiver 1310, the transmitter 1315, or various combinations thereof or various components thereof may be examples of means for performing various aspects of UE assistance for paging procedures as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a network node in accordance with examples as disclosed herein. For example, the communications manager 1320 may be configured as or otherwise support a means for receiving, from a base station, a control plane message indicating a configured time gap for a UE, the configured time gap between transmission of a PEI and transmission of a paging message via a paging channel. The communications manager 1320 may be configured as or otherwise support a means for identifying data for the UE after receiving the control plane message. The communications manager 1320 may be configured as or otherwise support a means for transmitting, to the base station, a paging notification message indicating the paging message for the UE and the data for the UE.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for more efficient utilization of communication resources. For example, by indicating PEI gaps and CE levels that have been previously configured for a UE via a paging notification message, the processor of the device 1305 may support efficient utilization of communication resources (e.g., paging notification message resources), and may provide for a base station 105 or other device to reduce latency and processing associated with obtaining the PEI gap and CE level information.

Figure 14:
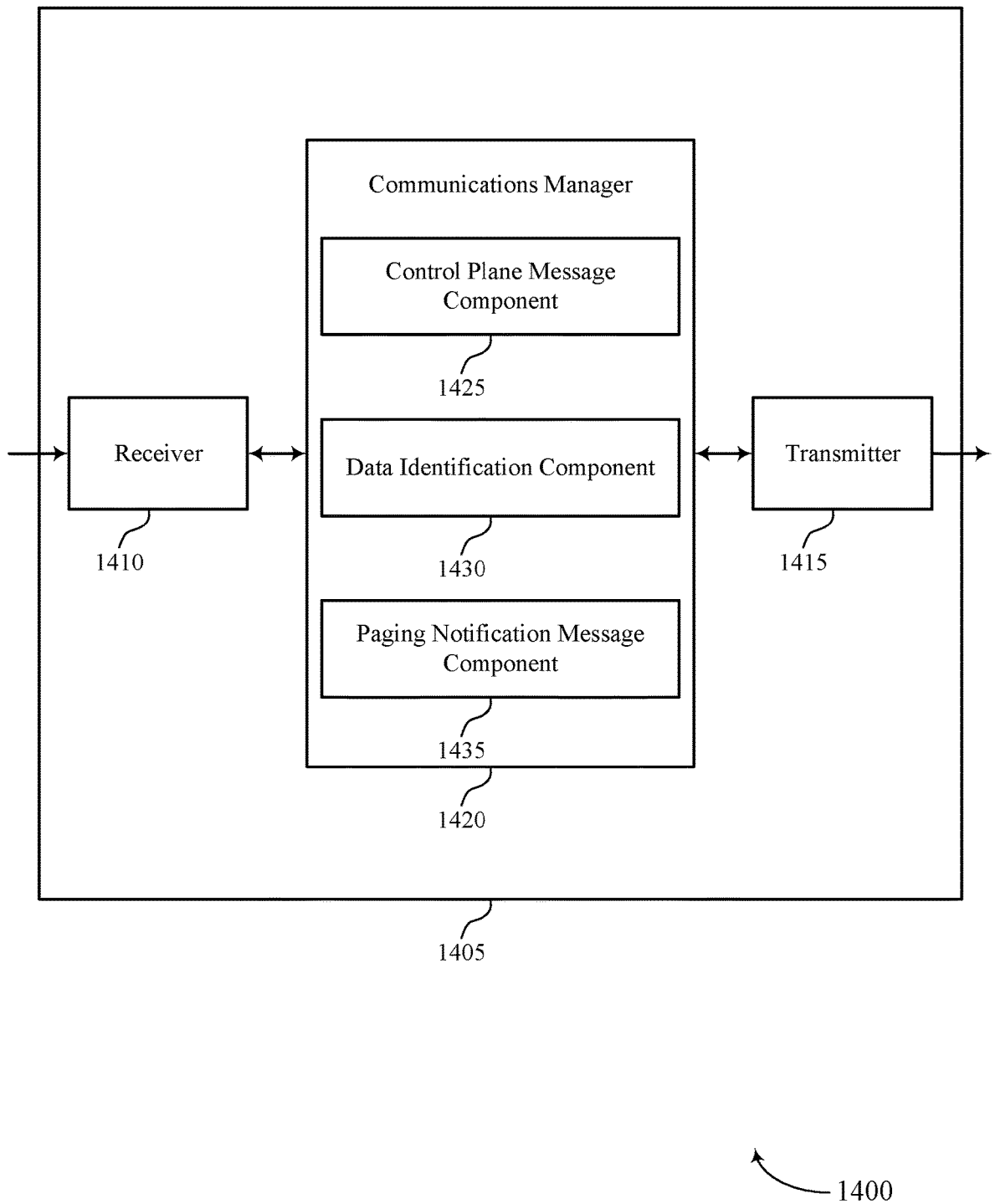

FIG. 14 shows a block diagram 1400 of a device 1405 that supports UE assistance for paging procedures in accordance with aspects of the present disclosure. The device 1405 may be an example of aspects of a device 1305 or a network node as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to UE assistance for paging procedures). Information may be passed on to other components of the device 1405. The receiver 1410 may utilize a single antenna or a set of multiple antennas.

The transmitter 1415 may provide a means for transmitting signals generated by other components of the device 1405. The transmitter 1415 may utilize a single antenna or a set of multiple antennas.

The device 1405, or various components thereof, may be an example of means for performing various aspects of UE assistance for paging procedures as described herein. For example, the communications manager 1420 may include a control plane message component 1425, a data identification component 1430, a paging notification message component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a network node in accordance with examples as disclosed herein. The control plane message component 1425 may be configured as or otherwise support a means for receiving, from a base station, a control plane message indicating a configured time gap for a UE, the configured time gap between transmission of a PEI and transmission of a paging message via a paging channel. The data identification component 1430 may be configured as or otherwise support a means for identifying data for the UE after receiving the control plane message. The paging notification message component 1435 may be configured as or otherwise support a means for transmitting, to the base station, a paging notification message indicating the paging message for the UE and the data for the UE.

Figure 15:
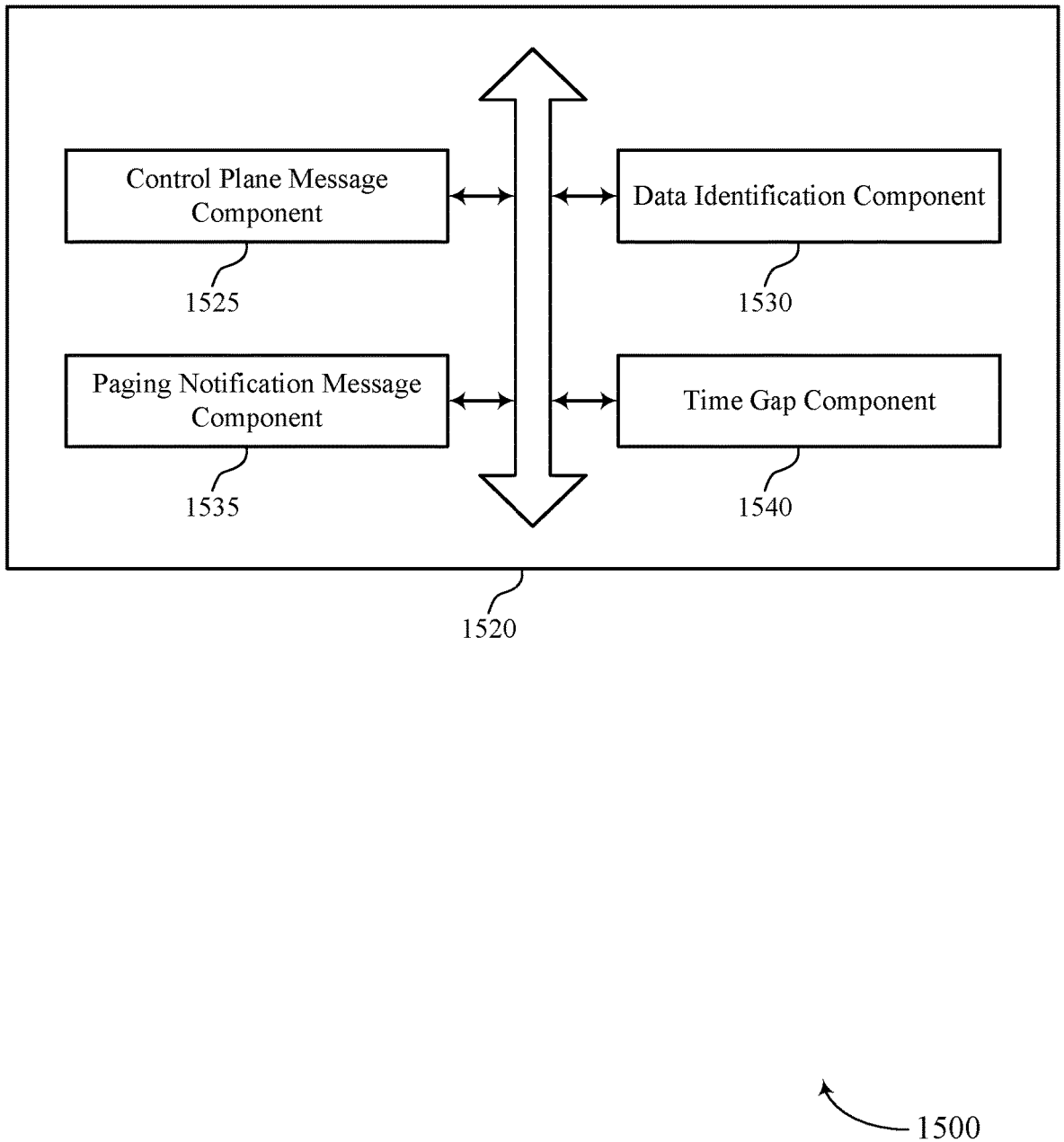
FIG. 15 shows a block diagram of a communications manager that supports UE assistance for paging procedures in accordance with aspects of the present disclosure.

FIG. 15 shows a block diagram 1500 of a communications manager 1520 that supports UE assistance for paging procedures in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of UE assistance for paging procedures as described herein. For example, the communications manager 1520 may include a control plane message component 1525, a data identification component 1530, a paging notification message component 1535, a time gap component 1540, or any combination thereof. Each of these components may communicate, directly or indirectly, with one another (e.g., via one or more buses).

The communications manager 1520 may support wireless communications at a network node in accordance with examples as disclosed herein. The control plane message component 1525 may be configured as or otherwise support a means for receiving, from a base station, a control plane message indicating a configured time gap for a UE, the configured time gap between transmission of a PEI and transmission of a paging message via a paging channel. The data identification component 1530 may be configured as or otherwise support a means for identifying data for the UE after receiving the control plane message. The paging notification message component 1535 may be configured as or otherwise support a means for transmitting, to the base station, a paging notification message indicating the paging message for the UE and the data for the UE.

In some examples, the time gap component 1540 may be configured as or otherwise support a means for storing, at the network node, the configured time gap for the UE and one or more other time gaps for one or more other UEs.

In some examples, the paging notification message component 1535 may be configured as or otherwise support a means for transmitting, to a second base station, a second paging notification message indicating the configured time gap for the UE based on a connection between the UE and the second base station.

Figure 16:
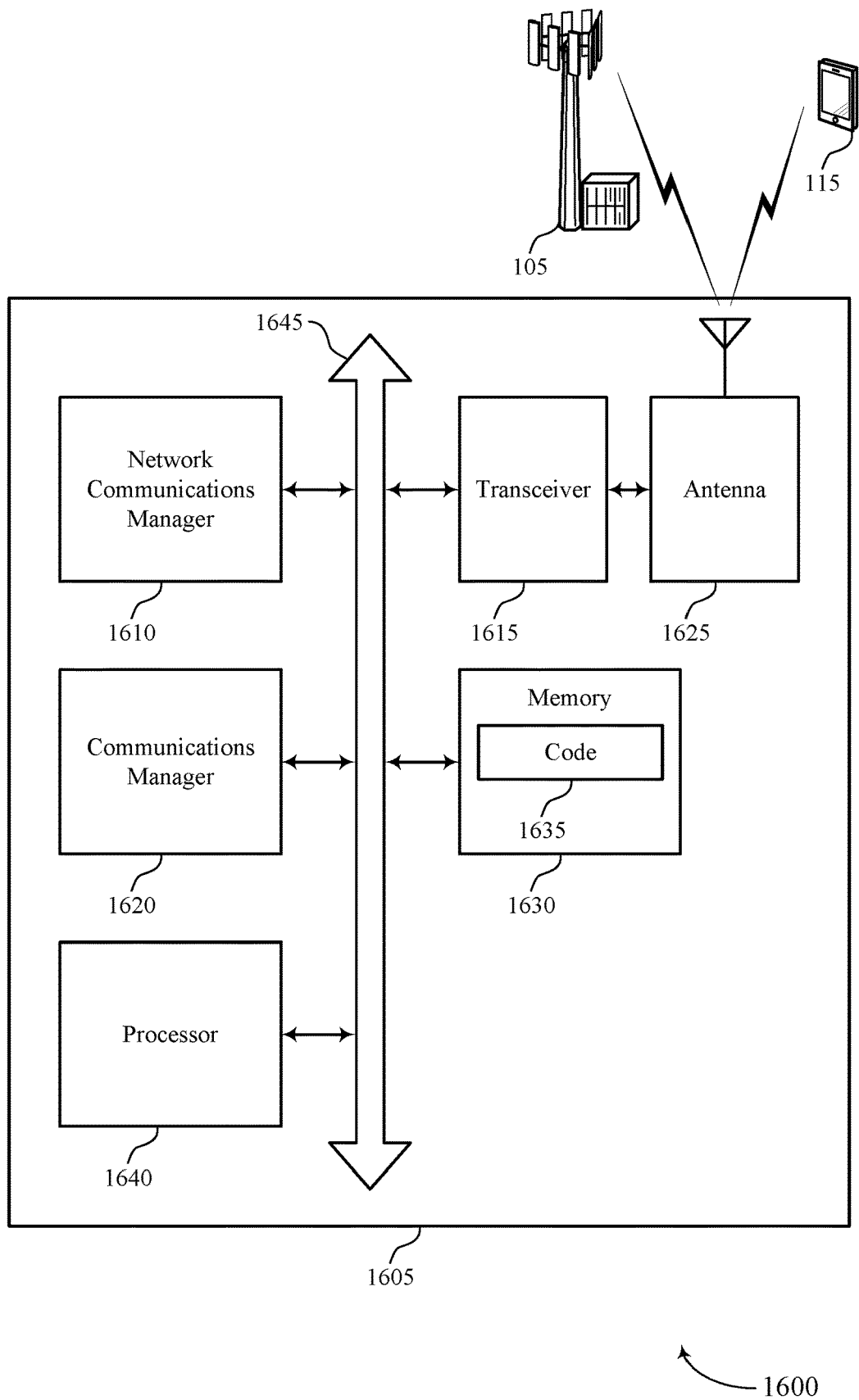
FIG. 16 shows a diagram of a system including a device that supports UE assistance for paging procedures in accordance with aspects of the present disclosure.

FIG. 16 shows a diagram of a system 1600 including a device 1605 that supports UE assistance for paging procedures in accordance with aspects of the present disclosure.

The device 1605 may be an example of or include the components of a device 1305, a device 1405, or a network node as described herein. The device 1605 may include components for bi-directional voice and data communications including components for transmitting and receiving communications, such as a communications manager 1620, a network communications manager 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The network communications manager 1610 may manage communications for the core network. For example, the network communications manager 1610 may manage the transfer of data communications from the core network to one or more client devices, such as one or more base stations 105 or UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets and provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting UE assistance for paging procedures). For example, the device 1605 or a component of the device 1605 may include a processor 1640 and memory 1630 coupled to the processor 1640, the processor 1640 and memory 1630 configured to perform various functions described herein.

The communications manager 1620 may support wireless communications at a network node in accordance with examples as disclosed herein. For example, the communications manager 1620 may be configured as or otherwise support a means for receiving, from a base station, a control plane message indicating a configured time gap for a UE, the configured time gap between transmission of a PEI and transmission of a paging message via a paging channel. The communications manager 1620 may be configured as or otherwise support a means for identifying data for the UE after receiving the control plane message. The communications manager 1620 may be configured as or otherwise support a means for transmitting, to the base station, a paging notification message indicating the paging message for the UE and the data for the UE.

By including or configuring the communications manager 1620 in accordance with examples as described herein, the device 1605 may support techniques for improved communication reliability, reduced latency, and improved coordination between devices. For example, by maintaining configured PEI gaps and CE levels for UEs 115 within the network and transmitting an indication of the configured communication parameters to a base station 105 or other device, the device 1605 may provide for the base station 105 to refrain from obtaining the communication parameters directly from the UE 115, which may support reduced latency. Additionally or alternatively, by transmitting the configured parameters via a paging notification message, the device 1605 may inform the base station 105 of preferred parameters for a UE 115 that is to receive the corresponding paging message, which may support improved communication reliability and improved coordination between devices.

Figure 17:
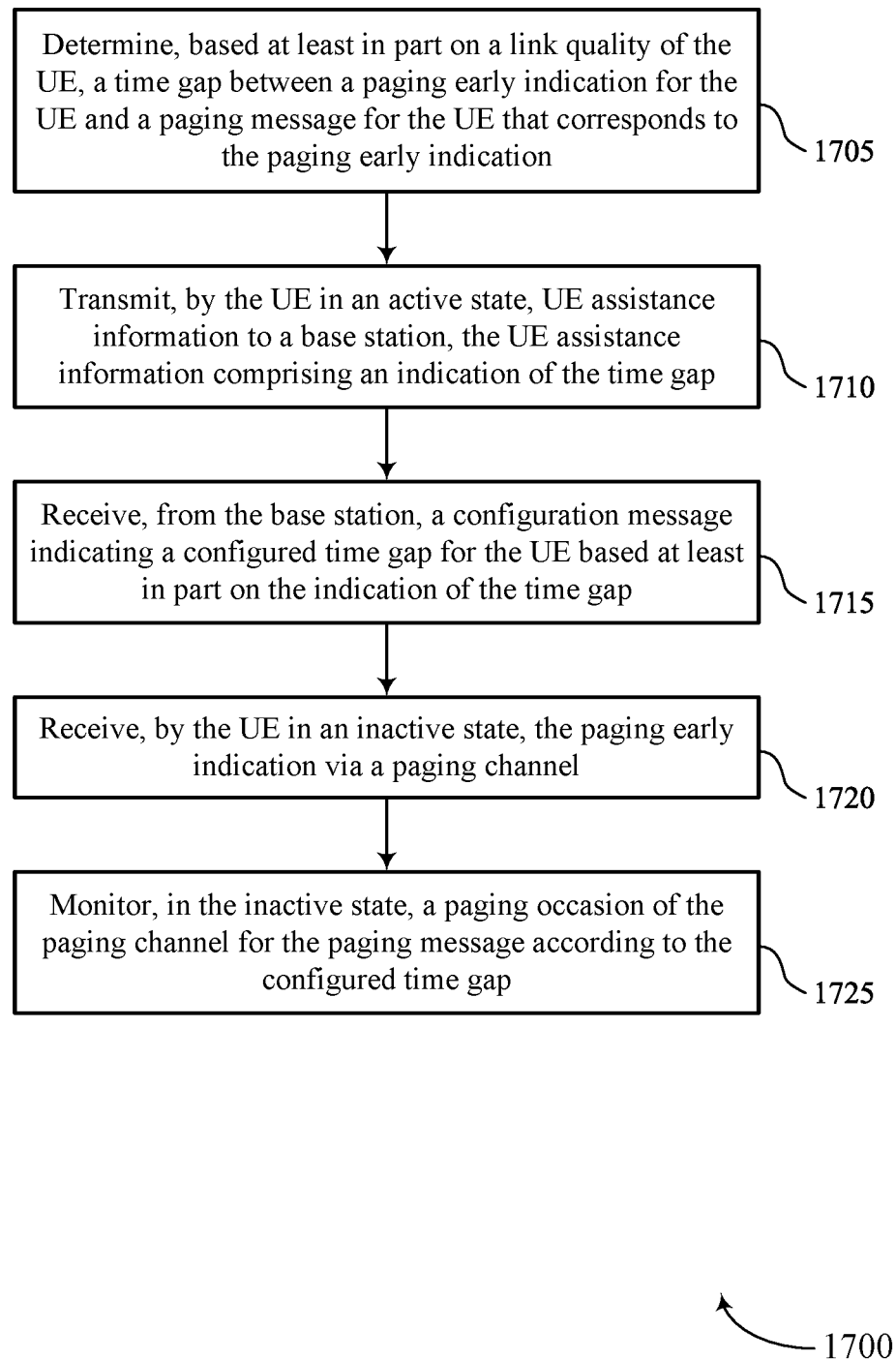
FIGS. 17 through 21 show flowcharts illustrating methods that support UE assistance for paging procedures in accordance with aspects of the present disclosure.

FIG. 17 shows a flowchart illustrating a method 1700 that supports UE assistance for paging procedures in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include determining, based on a link quality of the UE, a time gap between a PEI for the UE and a paging message for the UE that corresponds to the PEI. The operations of 1705 may be performed in accordance with examples as disclosed herein. In some examples, aspects of the operations of 1705 may be performed by a time gap component 725 as described with reference to FIG. 7.

At 1710, the method may include transmitting, by the UE in an active state, UAI to a base station, the UAI including an indication of the time gap. The operations of 1710 may be performed in accordance with examples as disclosed herein. In some examples, aspects of the operations of 1710 may be performed by a UAI component 730 as described with reference to FIG. 7.

At 1715, the method may include receiving, from the base station, a configuration message indicating a configured time gap for the UE based on the indication of the time gap. The operations of 1715 may be performed in accordance with examples as disclosed herein. In some examples, aspects of the operations of 1715 may be performed by a configuration component 735 as described with reference to FIG. 7.

At 1720, the method may include receiving, by the UE in an inactive state, the PEI via a paging channel. The operations of 1720 may be performed in accordance with examples as disclosed herein. In some examples, aspects of the operations of 1720 may be performed by a PEI component 740 as described with reference to FIG. 7.

At 1725, the method may include monitoring, in the inactive state, a paging occasion of the paging channel for the paging message according to the configured time gap. The operations of 1725 may be performed in accordance with examples as disclosed herein. In some examples, aspects of the operations of 1725 may be performed by a paging occasion component 745 as described with reference to FIG. 7.

Figure 18:
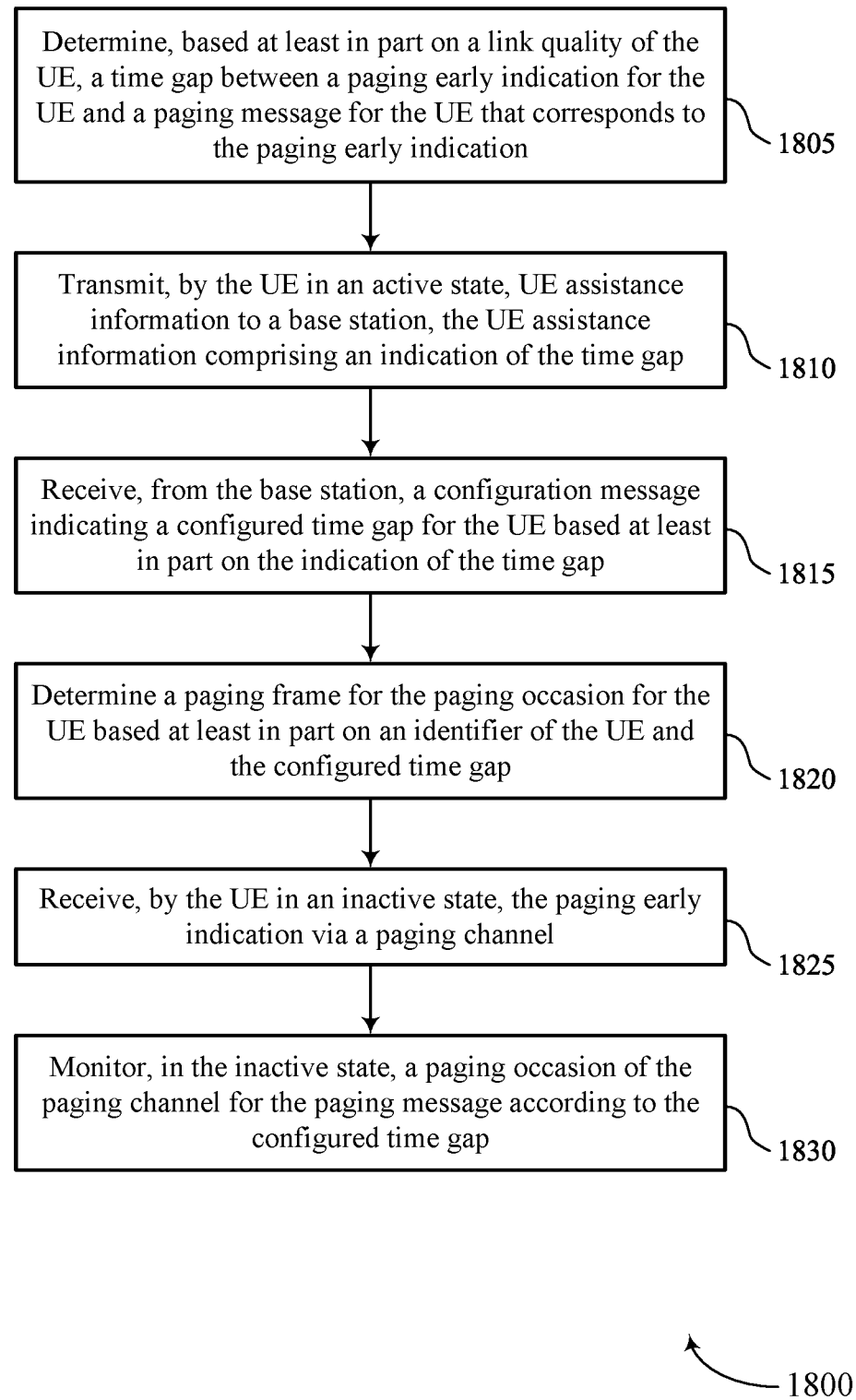

FIG. 18 shows a flowchart illustrating a method 1800 that supports UE assistance for paging procedures in accordance with aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1805, the method may include determining, based on a link quality of the UE, a time gap between a PEI for the UE and a paging message for the UE that corresponds to the PEI. The operations of 1805 may be performed in accordance with examples as disclosed herein. In some examples, aspects of the operations of 1805 may be performed by a time gap component 725 as described with reference to FIG. 7.

At 1810, the method may include transmitting, by the UE in an active state, UAI to a base station, the UAI including an indication of the time gap. The operations of 1810 may be performed in accordance with examples as disclosed herein. In some examples, aspects of the operations of 1810 may be performed by a UAI component 730 as described with reference to FIG. 7.

At 1815, the method may include receiving, from the base station, a configuration message indicating a configured time gap for the UE based on the indication of the time gap. The operations of 1815 may be performed in accordance with examples as disclosed herein. In some examples, aspects of the operations of 1815 may be performed by a configuration component 735 as described with reference to FIG. 7.

At 1820, the method may include determining a paging frame for the paging occasion for the UE based on an ID of the UE and the configured time gap. The operations of 1820 may be performed in accordance with examples as disclosed herein. In some examples, aspects of the operations of 1820 may be performed by a paging occasion component 745 as described with reference to FIG. 7.

At 1825, the method may include receiving, by the UE in an inactive state, the PEI via a paging channel. The operations of 1825 may be performed in accordance with examples as disclosed herein. In some examples, aspects of the operations of 1825 may be performed by a PEI component 740 as described with reference to FIG. 7.

At 1830, the method may include monitoring, in the inactive state, a paging occasion of the paging channel for the paging message according to the configured time gap. The operations of 1830 may be performed in accordance with examples as disclosed herein. In some examples, aspects of the operations of 1830 may be performed by a paging occasion component 745 as described with reference to FIG. 7.

Figure 19:
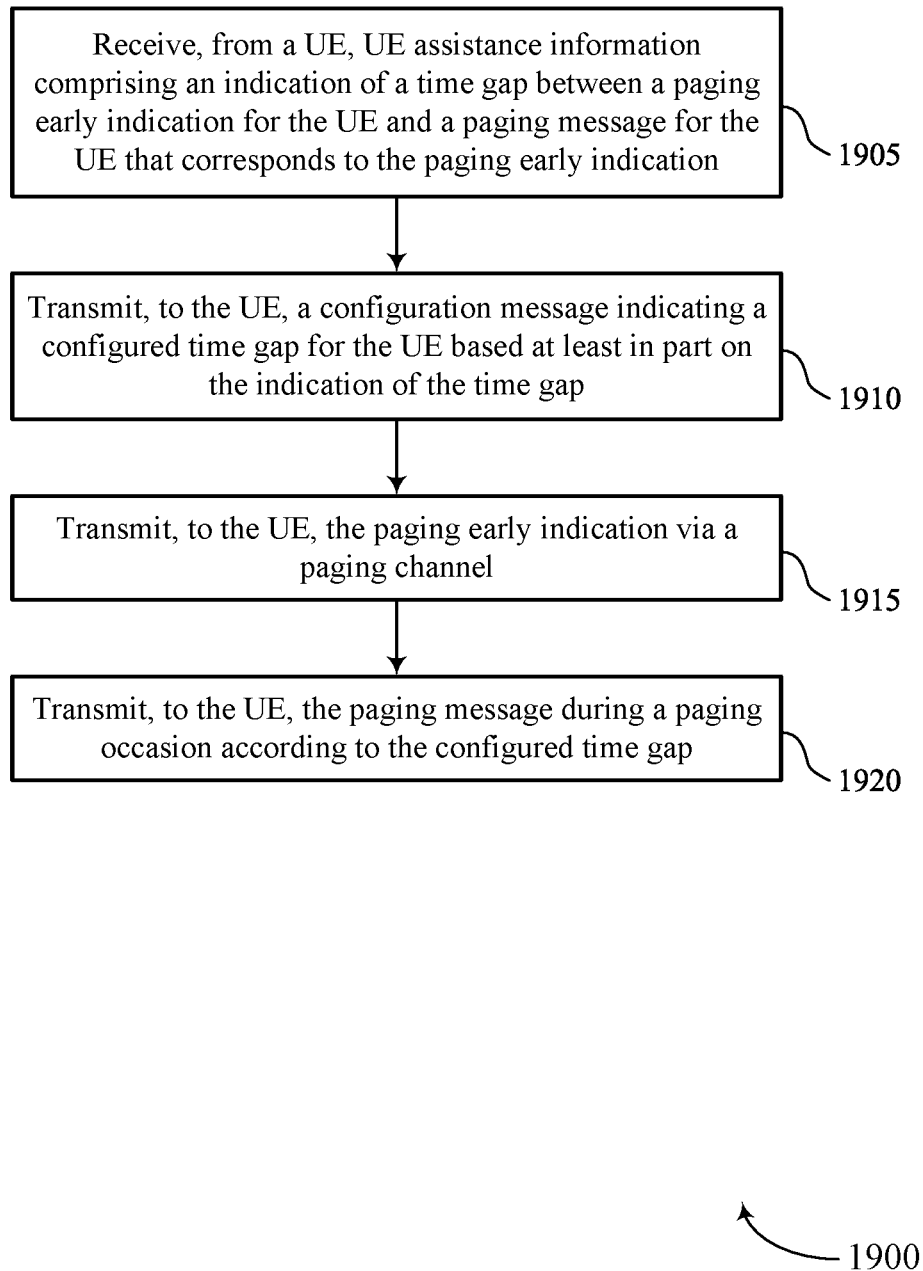

FIG. 19 shows a flowchart illustrating a method 1900 that supports UE assistance for paging procedures in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include receiving, from a UE, UAI including an indication of a time gap between a PEI for the UE and a paging message for the UE that corresponds to the PEI. The operations of 1905 may be performed in accordance with examples as disclosed herein. In some examples, aspects of the operations of 1905 may be performed by a UAI reception component 1125 as described with reference to FIG. 11.

At 1910, the method may include transmitting, to the UE, a configuration message indicating a configured time gap for the UE based on the indication of the time gap. The operations of 1910 may be performed in accordance with examples as disclosed herein. In some examples, aspects of the operations of 1910 may be performed by a configuration message component 1130 as described with reference to FIG. 11.

At 1915, the method may include transmitting, to the UE, the PEI via a paging channel. The operations of 1915 may be performed in accordance with examples as disclosed herein. In some examples, aspects of the operations of 1915 may be performed by a PEI component 1135 as described with reference to FIG. 11.

At 1920, the method may include transmitting, to the UE, the paging message during a paging occasion according to the configured time gap. The operations of 1920 may be performed in accordance with examples as disclosed herein. In some examples, aspects of the operations of 1920 may be performed by a paging occasion component 1140 as described with reference to FIG. 11.

Figure 20:
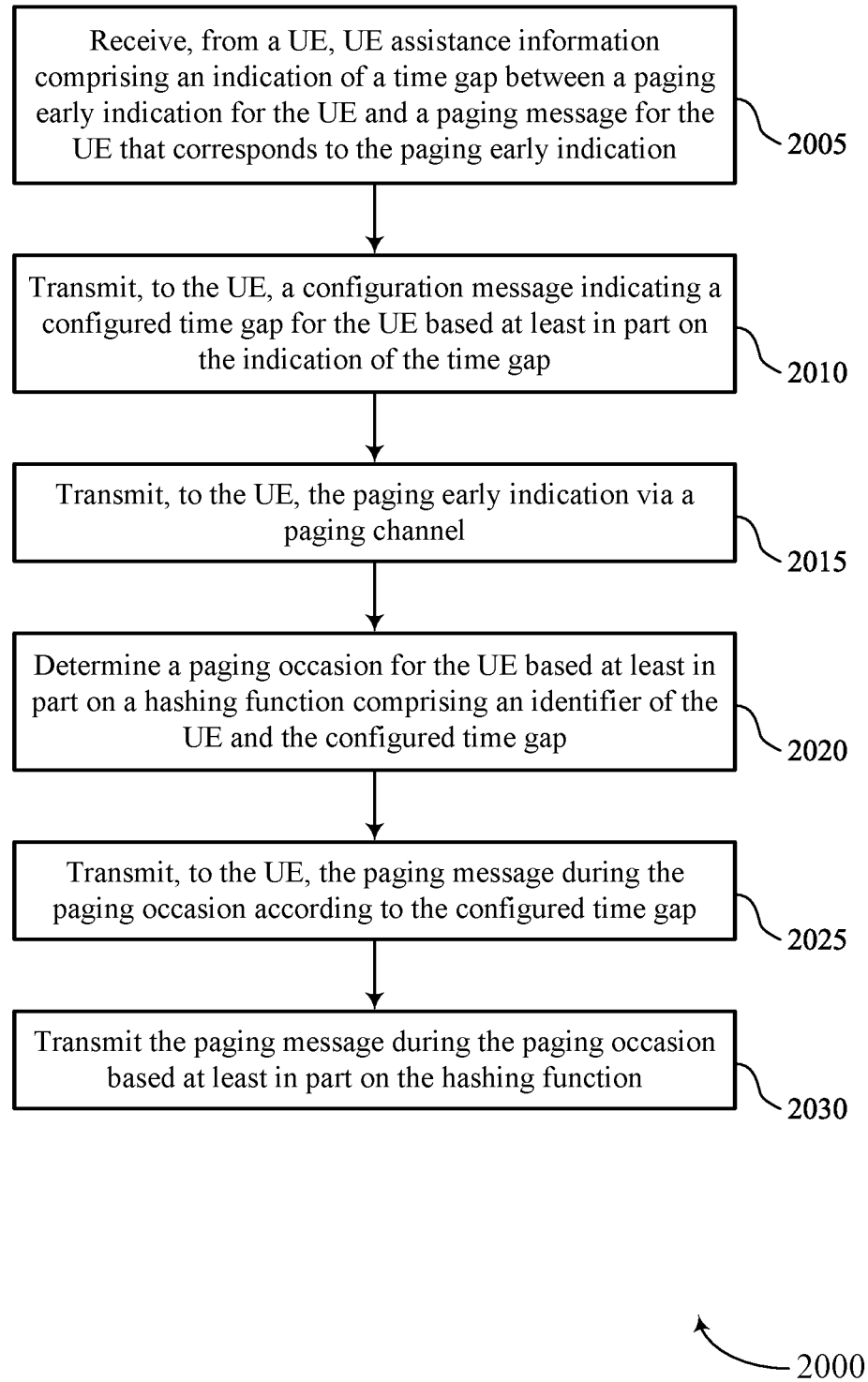

FIG. 20 shows a flowchart illustrating a method 2000 that supports UE assistance for paging procedures in accordance with aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include receiving, from a UE, UAI including an indication of a time gap between a PEI for the UE and a paging message for the UE that corresponds to the PEI. The operations of 2005 may be performed in accordance with examples as disclosed herein. In some examples, aspects of the operations of 2005 may be performed by a UAI reception component 1125 as described with reference to FIG. 11.

At 2010, the method may include transmitting, to the UE, a configuration message indicating a configured time gap for the UE based on the indication of the time gap. The operations of 2010 may be performed in accordance with examples as disclosed herein. In some examples, aspects of the operations of 2010 may be performed by a configuration message component 1130 as described with reference to FIG. 11.

At 2015, the method may include transmitting, to the UE, the PEI via a paging channel. The operations of 2015 may be performed in accordance with examples as disclosed herein. In some examples, aspects of the operations of 2015 may be performed by a PEI component 1135 as described with reference to FIG. 11.

At 2020, the method may include determining a paging occasion for the UE based on a hashing function including an ID of the UE and the configured time gap. The operations of 2020 may be performed in accordance with examples as disclosed herein. In some examples, aspects of the operations of 2020 may be performed by a paging occasion component 1140 as described with reference to FIG. 11.

At 2025, the method may include transmitting, to the UE, the paging message during the paging occasion according to the configured time gap. The operations of 2025 may be performed in accordance with examples as disclosed herein. In some examples, aspects of the operations of 2025 may be performed by a paging occasion component 1140 as described with reference to FIG. 11.

At 2030, the method may include transmitting the paging message during the paging occasion based on the hashing function. The operations of 2030 may be performed in accordance with examples as disclosed herein. In some examples, aspects of the operations of 2030 may be performed by a paging message component 1145 as described with reference to FIG. 11.

Figure 21:
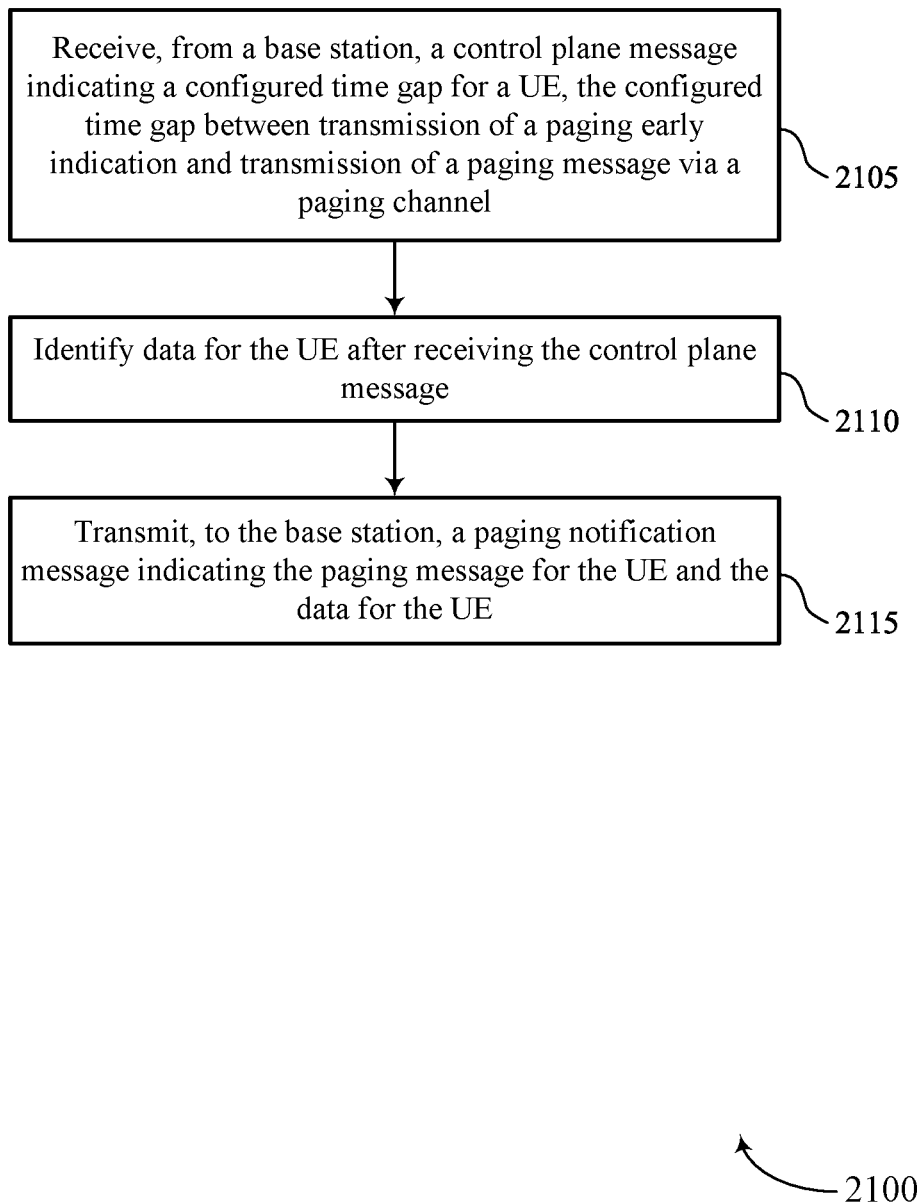

FIG. 21 shows a flowchart illustrating a method 2100 that supports UE assistance for paging procedures in accordance with aspects of the present disclosure. The operations of the method 2100 may be implemented by a network node or its components as described herein. For example, the operations of the method 2100 may be performed by a network node as described with reference to FIGS. 1 through 4 and 13 through 16. In some examples, a network node may execute a set of instructions to control the functional elements of the network node to perform the described functions. Additionally or alternatively, the network node may perform aspects of the described functions using special-purpose hardware.

At 2105, the method may include receiving, from a base station, a control plane message indicating a configured time gap for a UE, the configured time gap between transmission of a PEI and transmission of a paging message via a paging channel. The operations of 2105 may be performed in accordance with examples as disclosed herein. In some examples, aspects of the operations of 2105 may be performed by a control plane message component 1525 as described with reference to FIG. 15.

At 2110, the method may include identifying data for the UE after receiving the control plane message. The operations of 2110 may be performed in accordance with examples as disclosed herein. In some examples, aspects of the operations of 2110 may be performed by a data identification component 1530 as described with reference to FIG. 15.

At 2115, the method may include transmitting, to the base station, a paging notification message indicating the paging message for the UE and the data for the UE. The operations of 2115 may be performed in accordance with examples as disclosed herein. In some examples, aspects of the operations of 2115 may be performed by a paging notification message component 1535 as described with reference to FIG. 15.

SUMMARY OF ASPECTS

The following provides an overview of aspects of the present disclosure:

Aspect 1: A method for wireless communications at a UE, comprising: determining, based at least in part on a link quality of the UE, a time gap between a PEI for the UE and a paging message for the UE that corresponds to the PEI; transmitting, by the UE in an active state, UAI to a base station, the UAI comprising an indication of the time gap; receiving, from the base station, a configuration message indicating a configured time gap for the UE based at least in part on the indication of the time gap; receiving, by the UE in an inactive state, the PEI via a paging channel; and monitoring, in the inactive state, a paging occasion of the paging channel for the paging message according to the configured time gap.

Aspect 2: The method of aspect 1, further comprising: determining a paging frame for the paging occasion for the UE based at least in part on an ID of the UE and the configured time gap.

Aspect 3: The method of aspect 2, further comprising: determining an index for the paging occasion within the paging frame for the UE based at least in part on the configured time gap.

Aspect 4: The method of any of aspects 1 through 3, further comprising: identifying a number of measurements of downlink reference signals for obtaining channel quality information for the paging channel, wherein the number of measurements of the downlink reference signals is based at least in part on the link quality of the UE; and determining the time gap based at least in part on the number of measurements of the downlink reference signals and a periodicity associated with the downlink reference signals.

Aspect 5: The method of aspect 4, further comprising: decoding, during the configured time gap after receiving the PEI, the downlink reference signals; determining the channel quality information for the paging channel based at least in part on decoding the downlink reference signals; and decoding the paging message based at least in part on the channel quality information for the paging channel.

Aspect 6: The method of any of aspects 4 through 5, wherein the downlink reference signals comprise SSBs, TRSs, or CSI-RSs, or any combination thereof.

Aspect 7: The method of any of aspects 1 through 6, further comprising: transitioning to the active state before transmitting the UAI, wherein the active state is a RRC connected state; receiving, from the base station, a release message; and transitioning to the inactive state based at least in part on the release message, wherein the inactive state is a RRC inactive state or a RRC idle state.

Aspect 8: The method of any of aspects 1 through 7, further comprising: determining a change in the link quality of the UE; transitioning from the inactive state to the active state; and transmitting, to the base station, second UAI indicating a second time gap for the UE based at least in part on the change in the link quality of the UE.

Aspect 9: The method of any of aspects 1 through 8, further comprising: receiving, via the PEI, an indication of the paging message for the UE; and transitioning from a sleep mode of a DRX cycle to a wake mode of the DRX cycle for the paging occasion based at least in part on the indication of the paging message; and monitoring the paging occasion for the paging message based at least in part on transitioning to the wake mode of the DRX cycle.

Aspect 10: The method of any of aspects 1 through 9, further comprising: transmitting, to the base station via the UAI, a first CE level supported by the UE; receiving, from the base station via the configuration message, a configured CE level for the UE; and receiving the PEI and the paging message according to the configured CE level.

Aspect 11: The method of aspect 10, further comprising: determining a paging frame for the paging occasion for the UE based at least in part on the configured CE level.

Aspect 12: The method of any of aspects 1 through 11, further comprising: receiving one or more reference signals from the base station; measuring a signal parameter of the one or more reference signals received by the UE; and determining the link quality of the UE based at least in part on the measured signal parameter.

Aspect 13: The method of any of aspects 1 through 12, further comprising: transmitting the UAI to the base station via a RRC message; and receiving the configuration message from the base station in response to the UAI, wherein the configuration message is a RRC reconfiguration message.

Aspect 14: The method of any of aspects 1 through 13, wherein determining the time gap comprises: determining the time gap to be a first time gap less than a second time gap based at least in part on the link quality exceeding a link quality threshold.

Aspect 15: A method for wireless communications at a base station, comprising: receiving, from a UE, UAI comprising an indication of a time gap between a PEI for the UE and a paging message for the UE that corresponds to the PEI; transmitting, to the UE, a configuration message indicating a configured time gap for the UE based at least in part on the indication of the time gap; transmitting, to the UE, the PEI via a paging channel; and transmitting, to the UE, the paging message during a paging occasion according to the configured time gap.

Aspect 16: The method of aspect 15, further comprising: determining the paging occasion for the UE based at least in part on a hashing function comprising an ID of the UE and the configured time gap; and transmitting the paging message during the paging occasion based at least in part on the hashing function.

Aspect 17: The method of any of aspects 15 through 16, further comprising: determining the paging occasion for the UE based at least in part on a hashing function comprising a configured CE level for the UE; and transmitting the paging message during the paging occasion based at least in part on the hashing function.

Aspect 18: The method of any of aspects 15 through 17, further comprising: determining the configured time gap for the UE based at least in part on the indication of the time gap for the UE and scheduling information for one or more other UEs, wherein the scheduling information is based at least in part on one or more other time gaps for the one or more other UEs.

Aspect 19: The method of any of aspects 15 through 18, further comprising: transmitting, to a network node, a control plane message indicating the configured time gap for the UE.

Aspect 20: The method of any of aspects 15 through 19, further comprising: receiving, from a network node, a paging notification message indicating the paging message for the UE and the configured time gap for the UE.

Aspect 21: The method of any of aspects 15 through 20, wherein transmitting the configuration message further comprises: transmitting a RRC reconfiguration message indicating the configured time gap.

Aspect 22: The method of any of aspects 15 through 21, further comprising: receiving, from the UE via the UAI, an indication of a CE level for the UE; transmitting, to the UE via the configuration message, a configured CE level for the UE; and transmitting the PEI and the paging message according to the configured CE level.

Aspect 23: A method for wireless communications at a network node, comprising: receiving, from a base station, a control plane message indicating a configured time gap for a UE, the configured time gap between transmission of a PEI and transmission of a paging message via a paging channel; identifying data for the UE after receiving the control plane message; and transmitting, to the base station, a paging notification message indicating the paging message for the UE and the data for the UE.

Aspect 24: The method of aspect 23, further comprising: storing, at the network node, the configured time gap for the UE and one or more other time gaps for one or more other UEs.

Aspect 25: The method of any of aspects 23 through 24, further comprising: transmitting, to a second base station, a second paging notification message indicating the configured time gap for the UE based at least in part on a connection between the UE and the second base station.

Aspect 26: An apparatus for wireless communications at a UE, comprising a processor; memory coupled with the processor; and instructions stored in the memory and executable by the processor to cause the apparatus to perform a method of any of aspects 1 through 14.

Aspect 27: An apparatus for wireless communications at a UE, comprising at least one means for performing a method of any of aspects 1 through 14.

Aspect 28: A non-transitory computer-readable medium storing code for wireless communications at a UE, the code comprising instructions executable by a processor to perform a method of any of aspects 1 through 14.

Aspect 29: An apparatus for wireless communications at a base station, comprising a processor; memory coupled with the processor; and instructions stored in the memory and executable by the processor to cause the apparatus to perform a method of any of aspects 15 through 22.

Aspect 30: An apparatus for wireless communications at a base station, comprising at least one means for performing a method of any of aspects 15 through 22.

Aspect 31: A non-transitory computer-readable medium storing code for wireless communications at a base station, the code comprising instructions executable by a processor to perform a method of any of aspects 15 through 22.

Aspect 32: An apparatus for wireless communications at a network node, comprising a processor; memory coupled with the processor; and instructions stored in the memory and executable by the processor to cause the apparatus to perform a method of any of aspects 23 through 25.

Aspect 33: An apparatus for wireless communications at a network node, comprising at least one means for performing a method of any of aspects 23 through 25.

Aspect 34: A non-transitory computer-readable medium storing code for wireless communications at a network node, the code comprising instructions executable by a processor to perform a method of any of aspects 23 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    transmitting, by the UE in an active state, UE assistance information, the UE assistance information comprising an indication of a time gap between a paging early indication for the UE and a paging message for the UE that corresponds to the paging early indication, wherein a duration of the time gap is based at least in part on a comparison of a link quality of the UE with a link quality threshold;
    receiving a configuration message indicating a configured time gap for the UE based at least in part on the indication of the time gap;
    receiving, by the UE in an inactive state, the paging early indication via a paging channel; and
    monitoring, in the inactive state, a paging occasion of the paging channel for the paging message according to the configured time gap.

2. The method of claim 1, further comprising:
    determining a paging frame for the paging occasion for the UE based at least in part on an identifier of the UE and the configured time gap.

3. The method of claim 2, further comprising:
    determining an index for the paging occasion within the paging frame for the UE based at least in part on the configured time gap.

4. The method of claim 1, further comprising:
    identifying a number of measurements of downlink reference signals for obtaining channel quality information for the paging channel, wherein the number of measurements of the downlink reference signals is based at least in part on the link quality of the UE; and
    determining the duration of the time gap based at least in part on the number of measurements of the downlink reference signals and a periodicity associated with the downlink reference signals.

5. The method of claim 4, further comprising:
    decoding, during the configured time gap after receiving the paging early indication, the downlink reference signals;
    determining the channel quality information for the paging channel based at least in part on decoding the downlink reference signals; and
    decoding the paging message based at least in part on the channel quality information for the paging channel.

6. The method of claim 4, wherein the downlink reference signals comprise synchronization signal blocks (SSBs), tracking reference signals (TRSs), or channel state information reference signals (CSI-RSs), or any combination thereof.

7. The method of claim 1, further comprising:
    transitioning to the active state before transmitting the UE assistance information, wherein the active state is a radio resource control connected state;
    receiving a release message; and
    transitioning to the inactive state based at least in part on the release message, wherein the inactive state is a radio resource control inactive state or a radio resource control idle state.

8. The method of claim 1, further comprising:
    determining a change in the link quality of the UE;
    transitioning from the inactive state to the active state; and
    transmitting second UE assistance information indicating a second time gap for the UE based at least in part on the change in the link quality of the UE.

9. The method of claim 1, further comprising:
    receiving, via the paging early indication, an indication of the paging message for the UE;
    transitioning from a sleep mode of a discontinuous reception cycle to a wake mode of the discontinuous reception cycle for the paging occasion based at least in part on the indication of the paging message; and
    monitoring the paging occasion for the paging message based at least in part on transitioning to the wake mode of the discontinuous reception cycle.

10. The method of claim 1, further comprising:
    transmitting, via the UE assistance information, a first coverage enhancement level supported by the UE;
    receiving, via the configuration message, a configured coverage enhancement level for the UE; and receiving the paging early indication and the paging message according to the configured coverage enhancement level.

11. The method of claim 10, further comprising:
determining a paging frame for the paging occasion for the UE based at least in part on the configured coverage enhancement level.

12. The method of claim 1, further comprising:
receiving one or more reference signals;
measuring a signal parameter of the one or more reference signals received by the UE; and
determining the link quality of the UE based at least in part on the measured signal parameter.

13. The method of claim 1, further comprising:
transmitting the UE assistance information via a radio resource control message; and
receiving the configuration message in response to the UE assistance information, wherein the configuration message is a radio resource control reconfiguration message.

14. The method of claim 1, wherein determining the time gap comprises:
determining the time gap to be a first time gap less than a second time gap based at least in part on the link quality exceeding the link quality threshold.

15. A method for wireless communications at a network entity, comprising:
receiving user equipment (UE) assistance information comprising an indication of a time gap between a paging early indication for a UE and a paging message for the UE that corresponds to the paging early indication, wherein a duration of the time gap is based at least in part on a link quality of the UE and a link quality threshold;
transmitting a configuration message indicating a configured time gap for the UE based at least in part on the indication of the time gap;
transmitting the paging early indication via a paging channel; and
transmitting the paging message during a paging occasion according to the configured time gap between the paging early indication and the paging message.

16. The method of claim 15, further comprising:
determining the paging occasion for the UE based at least in part on a hashing function comprising an identifier of the UE and the configured time gap; and
transmitting the paging message during the paging occasion based at least in part on the hashing function.

17. The method of claim 15, further comprising:
determining the paging occasion for the UE based at least in part on a hashing function comprising a configured coverage enhancement level for the UE; and
transmitting the paging message during the paging occasion based at least in part on the hashing function.

18. The method of claim 15, further comprising:
determining the configured time gap for the UE based at least in part on the indication of the time gap for the UE and scheduling information for one or more other UEs, wherein the scheduling information is based at least in part on one or more other time gaps for the one or more other UEs.

19. The method of claim 15, further comprising:
transmitting, to a network node, a control plane message indicating the configured time gap for the UE.

20. The method of claim 15, further comprising:
receiving, from a network node, a paging notification message indicating the paging message for the UE and the configured time gap for the UE.

21. The method of claim 15, wherein transmitting the configuration message further comprises:
transmitting a radio resource control reconfiguration message indicating the configured time gap.

22. The method of claim 15, further comprising:
receiving, via the UE assistance information, an indication of a coverage enhancement level for the UE;
transmitting, via the configuration message, a configured coverage enhancement level for the UE; and
transmitting the paging early indication and the paging message according to the configured coverage enhancement level.

23. A method for wireless communications at a network node, comprising:
receiving a control plane message indicating a configured time gap for a user equipment (UE), the configured time gap between transmission of a paging early indication and transmission of a paging message via a paging channel, wherein a duration of the configured time gap is based at least in part on a link quality of the UE and a link quality threshold;
identifying data for the UE after receiving the control plane message; and
transmitting, to a network entity, a paging notification message indicating the paging message for the UE, the data for the UE, and the configured time gap for the UE.

24. The method of claim 23, further comprising:
storing, at the network node, the configured time gap for the UE and one or more other time gaps for one or more other UEs.

25. The method of claim 23, further comprising:
transmitting, to a second network entity, a second paging notification message indicating the configured time gap for the UE based at least in part on a connection between the UE and the second network entity.

26. An apparatus for wireless communications at a user equipment (UE), comprising:
a processor;
memory coupled with the processor; and
instructions stored in the memory and executable by the processor to cause the apparatus to:
transmit, by the UE in an active state, UE assistance information, the UE assistance information comprising an indication of a time gap between a paging early indication for the UE and a paging message for the UE that corresponds to the paging early indication, wherein a duration of the time gap is based at least in part on a comparison of a link quality of the UE with a link quality threshold;
receive a configuration message indicating a configured time gap for the UE based at least in part on the indication of the time gap;
receive, by the UE in an inactive state, the paging early indication via a paging channel; and
monitor, in the inactive state, a paging occasion of the paging channel for the paging message according to the configured time gap.

27. The apparatus of claim 26, wherein the instructions are further executable by the processor to cause the apparatus to:
determine a paging frame for the paging occasion for the UE based at least in part on an identifier of the UE and the configured time gap.

28. The apparatus of claim 27, wherein the instructions are further executable by the processor to cause the apparatus to:
   determine an index for the paging occasion within the paging frame for the UE based at least in part on the configured time gap.

29. The apparatus of claim 26, wherein the instructions are further executable by the processor to cause the apparatus to:
   identify a number of measurements of downlink reference signals for obtaining channel quality information for the paging channel, wherein the number of measurements of the downlink reference signals is based at least in part on the link quality of the UE; and
   determine the duration of the time gap based at least in part on the number of measurements of the downlink reference signals and a periodicity associated with the downlink reference signals.

30. An apparatus for wireless communications at a base station, comprising:
   a processor;
   memory coupled with the processor; and
   instructions stored in the memory and executable by the processor to cause the apparatus to:
      receive user equipment (UE) assistance information comprising an indication of a time gap between a paging early indication for a UE and a paging message for the UE that corresponds to the paging early indication, wherein a duration of the time gap is based at least in part on a link quality of the UE and a link quality threshold;
      transmit a configuration message indicating a configured time gap for the UE based at least in part on the indication of the time gap;
      transmit the paging early indication via a paging channel; and
      transmit the paging message during a paging occasion according to the configured time gap between the paging early indication and the paging message.

* * * * *